(12) United States Patent
Wu et al.

(10) Patent No.: US 10,985,879 B2
(45) Date of Patent: Apr. 20, 2021

(54) METHOD AND APPARATUS FOR PROVIDING HARQ FEEDBACK IN WIRELESS COMMUNICATION SYSTEM

(71) Applicant: Samsung Electronics Co., Ltd., Suwon-si (KR)

(72) Inventors: Min Wu, Beijing (CN); Miao Zhou, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/861,950

(22) Filed: Apr. 29, 2020

(65) Prior Publication Data
US 2020/0351032 A1 Nov. 5, 2020

(30) Foreign Application Priority Data
Apr. 30, 2019 (CN) .......................... 201910365424.0

(51) Int. Cl.
*H04L 1/18* (2006.01)
*H04W 72/10* (2009.01)
*H04W 72/04* (2009.01)

(52) U.S. Cl.
CPC ....... *H04L 1/1861* (2013.01); *H04W 72/0406* (2013.01); *H04W 72/10* (2013.01)

(58) Field of Classification Search
CPC ....... H04L 1/1861; H04L 5/00; H04L 5/0053; H04L 1/1845; H04W 72/0406; H04W 72/10; H04W 72/08; H04W 24/08; H04W 72/04; H04W 76/23; H04W 72/082; H04W 76/14; H04W 72/12; H04W 28/06; H04W 72/1263; H04W 72/121; H04W 76/02; H04B 17/345
See application file for complete search history.

(56) References Cited

U.S. PATENT DOCUMENTS

| 2016/0066337 | A1* | 3/2016 | Sartori | H04W 72/0406 |
| | | | | 370/329 |
| 2018/0116007 | A1* | 4/2018 | Yasukawa | H04W 28/06 |
| 2019/0052436 | A1 | 2/2019 | Desai et al. | |
| 2019/0053251 | A1 | 2/2019 | Loehr et al. | |
| 2019/0075566 | A1* | 3/2019 | Kim | H04B 17/345 |
| 2020/0099476 | A1* | 3/2020 | Park | H04W 4/70 |

OTHER PUBLICATIONS

International Search Report dated Jul. 31, 2020, issued in an International Application No. PCT/KR2020/005760.
Korean Office Action dated Aug. 13, 2020, issued in a counterpart Korean Application No. 10-2020-0052895.
(Continued)

*Primary Examiner* — Hardikkumar D Patel
(74) *Attorney, Agent, or Firm* — Jefferson IP Law, LLP

(57) ABSTRACT

An HARQ feedback method and a UE performing the HARQ feedback method are provided. The HARQ feedback method includes transmitting a Physical Sidelink Control Channel (PSCCH)/Physical Sidelink Shared Channel (PSSCH) to a second UE, and receiving a Physical Sidelink Feedback Channel (PSFCH) transmitted by the second UE performing the HARQ feedback according to a decoding result of the PSCCH/PSSCH.

16 Claims, 12 Drawing Sheets

(56) References Cited

OTHER PUBLICATIONS

Huawei, HiSilicon; Design and contents of PSCCH and PSFCH; 3GPP TSG RAN WG1 Meeting #96bis; R1-1904689 Apr. 2, 2019, Xi'an, China.
Intel Corporation; Design of physical layer procedures for NR V2X sidelink communication; 3GPP TSG RAN WG1 RAN1#96bis; R1-1904299; Apr. 3, 2019, Xi'an, China.
Vivo; Discussion on mode 2 resource allocation mechanism; 3GPP TSG RAN WG1 #96bis; R1-1904074; Apr. 2, 2019, Xi'an, China.
Lenovo, Motorola Mobility; Discussion on physical layer procedures for NR sidelink; 3GPP TSG RAN WG1 #96bis; R1-1904579; Apr. 3, 2019, Xi'an, China.
Ericsson; On SCI and SFCI formats; 3GPP TSG-RAN WG1 Meeting #96bis; R1-1905490; Apr. 2, 2019, Xi'an, China.
Fraunhofer HHI, Fraunhofer IIS; Physical Layer Procedures for NR V2X; 3GPP TSG RAN WG1 #96bis; R1-1904331; Apr. 2, 2019, Xi'an, China.

* cited by examiner

METHOD AND APPARATUS FOR PROVIDING HARQ FEEDBACK IN WIRELESS COMMUNICATION SYSTEM

CROSS-REFERENCE TO RELATED APPLICATION(S)

This application is based on and claims priority under 35 U.S.C. § 119(a) of a Chinese patent application number 201910365424.0, filed on Apr. 30, 2019, in the Chinese Intellectual Property Office, the disclosure of which is incorporated by reference herein in its entirety.

BACKGROUND

1. Field

The disclosure relates to the field of wireless communication technique. More particularly, the disclosure relates to a Hybrid Automatic Repeat Request (HARQ) feedback method and a UE performing the HARQ feedback method.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a Hybrid Automatic Repeat Request (HARQ) feedback in a wireless communication system.

Additional aspects will be set forth in part in the description which follows, and, in part, will be apparent from the description, or may be learned by practice of the presented embodiments.

In accordance with an aspect of the disclosure a Hybrid Automatic Repeat Request (HARQ) feedback method which is performed by a first UE is provided. The HARQ feedback method includes transmitting a Physical Sidelink Control Channel (PSCCH)/Physical Sidelink Shared Channel (PSSCH) to a second UE, receiving a Physical Sidelink Feedback Channel (PSFCH) transmitted by the second UE performing HARQ feedback according to a decoding result of the PSCCH/PSSCH.

Alternatively, for a groupcast transmission, before the PSCCH/PSSCH is transmitted to the second UE, the HARQ feedback method may further include acquiring indication information of one of two HARQ feedback modes, wherein a first HARQ feedback mode is a mode in which the second UE only feeds back the NACK, and a second HARQ feedback mode is a mode in which the second UE feeds back the ACK/NACK.

Alternatively, the acquiring indication information of one of two HARQ feedback modes may include acquiring an HARQ feedback mode indicated by a UE-specific RRC signaling from a serving base station of the first UE, or, acquiring the HARQ feedback mode indicated by sidelink pre-configuration parameters, or, determining the HARQ feedback mode according to predefined rules.

Alternatively, the determining of the HARQ feedback mode according to predefined rules may include determining the HARQ feedback mode according to the type of a group to which UEs in the groupcast transmission belong, wherein the first HARQ feedback mode is used when the type of the group to which UEs in the groupcast transmission belong is connection-less, and/or, determining the HARQ feedback mode according to a number of members in the group to which UEs in the groupcast transmission belong, wherein the first HARQ feedback mode is used when the number of members in the group to which UEs in the groupcast transmission belong is greater than a number of PSFCH resources corresponding to one PSCCH resource, and/or, determining the HARQ feedback mode according to QoS of a data service, wherein the second HARQ feedback mode is used for the data service whose QoS requirement is within a preset range.

Alternatively, the PSCCH transmitted to the second UE includes indication information of the HARQ feedback mode.

Alternatively, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, the one of the plurality of PSFCH resources is determined by one or more of a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

Alternatively, in the second HARQ feedback mode, the second UEs in the group to which UEs in the groupcast transmission belong use one of a plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to an UE index number and one or more of a pre-configured PSFCH resource offset, a PSFCH initial resource indicated in the PSSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

Alternatively, when the PSCCH/PSSCH transmitted by the first UE to the second UE occupies a plurality of sub-channels, in the first HARQ feedback mode, all the second UEs in the group to which UEs in the groupcast transmission belong share one of all PSFCH resources corresponding to the plurality of PSCCH resources to transmit the PSFCH.

Alternatively, when the PSCCH/PSSCH transmitted by the first UE to the second UE occupies a plurality of sub-channels, in the second HARQ feedback mode, the second UEs in the group to which UEs in the groupcast transmission belong use one of all PSFCH resources corresponding to the plurality of PSCCH resources to transmit the PSFCH, respectively.

In accordance with another aspect of the disclosure, an HARQ feedback method which is performed by a second UE is provided. The HARQ feedback method includes receiving a PSCCH/PSSCH transmitted by a first UE, and decoding the received PSCCH/PSSCH transmitting a PSFCH to the first UE according to the decoding result of the PSCCH/PSSCH to perform HARQ feedback.

Alternatively, for a groupcast transmission, before receiving the PSCCH/PSSCH transmitted by the first UE, the HARQ feedback method may further include acquiring indication information of one of two HARQ feedback modes, wherein a first HARQ feedback mode is a mode in which the second UE only feeds back the NACK, and a second HARQ feedback mode is a mode in which the second UE feeds back the ACK/NACK.

Alternatively, the acquiring indication information of one of two HARQ feedback modes may include acquiring the HARQ feedback mode indicated by a UE-specific RRC signaling from a serving base station of the second UE, or, acquiring the HARQ feedback mode indicated by sidelink pre-configuration parameters, or, determining the HARQ feedback mode by the PSSCH.

Alternatively, the determining of the HARQ feedback mode by the PSSCH may include determining the HARQ feedback mode by SCI format carried by the PSSCH, and/or determining the HARQ feedback mode by specific indication information of the HARQ feedback mode included in the PSSCH, and/or, determining the HARQ feedback mode by specific indication information of PSFCH resources included in the PSSCH.

Alternatively, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, the one of the plurality of PSFCH resources is determined by one or more of a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

Alternatively, in the second HARQ feedback mode, the second UEs in a group to which UEs in the groupcast transmission belong use one of the plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to an UE index number and one or more of a pre-configured PSFCH resource offset, a PSFCH initial resource indicated in the PSSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

Alternatively, when the PSCCH/PSSCH transmitted by the first UE to the second UE occupies a plurality of sub-channels, in the first HARQ feedback mode, all the second UEs in a group to which UEs in the groupcast transmission belong share one of all PSFCH resources corresponding to a plurality of PSCCH resources to transmit the PSFCH.

Alternatively, when the PSCCH/PSSCH transmitted by the first UE to the second UE occupies a plurality of sub-channels, in the second HARQ feedback mode, the second UEs in the group to which UEs in the groupcast transmission belong use one of all PSFCH resources corresponding to a plurality of PSCCH resources to transmit the PSFCH, respectively.

Alternatively, the transmitting the PSFCH to the first UE may include discarding, when the number of PSFCHs to be transmitted exceeds the number allowed by a system, or when the transmitting of the PSFCH collides with the receiving of the PSFCH, a redundant PSFCH in one slot based on at least one of a priority of a data packet indicated in the PSCCH corresponding to the PSFCH, a transmission type of the PSCCH/PSSCH corresponding to the PSFCH, HARQ feedback information carried by the PSFCH, Reference Signal Received Power (RSRP) measured on the PSCCH/PSSCH corresponding to the PSFCH, and the HARQ feedback mode used by the PSFCH.

Alternatively, when both of the PSFCH resource and the PSCCH/PSSCH resource are FDM, the transmitting the PSFCH to the first UE may include discarding, when the transmitting of the PSCCH/PSSCH collides with the transmitting of the PSFCH, or when the transmitting of the PSCCH/PSSCH collides with the receiving of the PSFCH, or when the receiving of the PSCCH/PSSCH on the reserved resource collides with the transmitting of the PSFCH, the PSCCH/PSSCH or the PSFCH in one slot based on at least one of a priority of a data packet indicated within the PSCCH corresponding to the PSFCH, a PSCCH/PSSCH resource allocation manner, a fact that whether the resource of the transmitted PSCCH/PSSCH is reserved in advance by SCI, a transmission type of the PSCCH/PSSCH corresponding to the PSFCH, HARQ feedback information carried by the PSFCH, and the HARQ feedback mode used by the PSFCH.

In accordance with another aspect of the disclosure, a UE including a channel transmitting module configured to transmit a PSCCH/PSSCH to a second UE, and a feedback receiving module configured to receive a Physical Sidelink Feedback Channel (PSFCH) transmitted by the second UE performing the HARQ feedback according to a decoding result of the PSCCH/PSSCH is provided.

Alternatively, the UE may further include a first acquiring module configured to acquire indication information of one of two HARQ feedback modes, wherein a first HARQ feedback mode is a mode in which the second UE only feeds back an NACK, a second HARQ feedback mode is a mode in which the second UE feeds back an ACK/NACK.

Alternatively, the first acquiring module may be configured to acquire the HARQ feedback mode indicated by a UE-specific RRC signaling from a serving base station of the first UE, or, to acquire the HARQ feedback mode indicated by sidelink pre-configuration parameters, or, to determine the HARQ feedback mode according to pre-defined rules.

Alternatively, the first acquiring module may be configured to determine the HARQ feedback mode according to the type of a group to which UEs in the groupcast transmission belong, wherein the first HARQ feedback mode is used when the type of a group to which UEs in the groupcast transmission belong is connection-less, and/or, to determine the HARQ feedback mode according to the number of members in the group to which UEs in the groupcast transmission belong, wherein the first HARQ feedback mode is used when the number of members in a group to which UEs in the groupcast transmission belong is greater than a number of PSFCH resources corresponding to one PSCCH resource, and/or, to determine the HARQ feedback mode according to QoS of the data service, wherein the second HARQ feedback mode is used for the data service whose QoS requirement is within a preset range.

Alternatively, the PSCCH transmitted to the second UE may include indication information of the HARQ feedback mode.

Alternatively, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, the one of the plurality of PSFCH resources is determined by one or more of the following parameters a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

Alternatively, in the second HARQ feedback mode, the second UEs in a group to which UEs in a groupcast transmission belong use one of a plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to an UE index number and one or more of a pre-configured PSFCH resource offset, a PSFCH initial resource indicated in the PSSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

Alternatively, when the PSCCH/PSSCH transmitted by the first UE to the second UE occupies a plurality of sub-channels, in the first HARQ feedback mode, all the second UEs in a group to which UEs in a groupcast transmission belong share one of all PSFCH resources corresponding to the plurality of PSCCH resources to transmit the PSFCH.

Alternatively, when the PSCCH/PSSCH transmitted by the first UE to the second UE occupies a plurality of sub-channels, in the second HARQ feedback mode, the second UEs in a group to which UEs in a groupcast transmission belong use one of all PSFCH resources corresponding to the plurality of PSCCH resources to transmit the PSFCH, respectively.

In accordance with another aspect of the disclosure, a UE including a channel processing module configured to receive a PSCCH/PSSCH transmitted by a first UE, and to decode the received PSCCH/PSSCH, and a feedback module configured to transmit a PSFCH to the first UE according to a decoding result of the PSCCH/PSSCH to perform HARQ feedback is provided.

Alternatively, the UE may further include a second acquiring module configured to acquire indication information of one of two HARQ feedback modes, wherein a first HARQ feedback mode is a mode in which the second UE only feeds back the NACK, a second HARQ feedback mode is a mode in which the second UE feeds back the ACK/NACK.

Alternatively, the second acquiring module may be configured to acquire the HARQ feedback mode indicated by a UE-specific RRC signaling from a serving base station of the second UE, or, to acquire the HARQ feedback mode indicated by sidelink pre-configuration parameters, or, to determine the HARQ feedback mode by the PSSCH.

Alternatively, the second acquiring module may be configured to determine the HARQ feedback mode by SCI format carried by the PSSCH, and/or, to determine the HARQ feedback mode by specific indication information of the HARQ feedback mode included in the PSSCH, and/or, to determine the HARQ feedback mode by specific indication information of PSFCH resources included in the PSSCH.

Alternatively, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, the one of the plurality of PSFCH resources is determined by one or more of a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

Alternatively, in the second HARQ feedback mode, the second UEs in a group to which UEs in the groupcast transmission belong use one of the plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to an UE index number and one or more of a pre-configured PSFCH resource offset, a PSFCH initial resource indicated in the PSSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

Alternatively, when the PSCCH/PSSCH transmitted by the first UE to the second UE occupies a plurality of sub-channels, in the first HARQ feedback mode, all the second UEs in a group to which UEs in the groupcast transmission belong share one of all PSFCH resources corresponding to a plurality of PSCCH resources to transmit the PSFCH.

Alternatively, when the PSCCH/PSSCH transmitted by the first UE to the second UE occupies a plurality of sub-channels, in the second HARQ feedback mode, the second UEs in the group to which UEs in the groupcast transmission belong use one of all PSFCH resources corresponding to a plurality of PSCCH resources to transmit the PSFCH, respectively.

Alternatively, the feedback module may be configured to discard, when the number of PSFCHs to be transmitted exceeds the number allowed by a system, or when the transmitting of the PSFCH collides with the receiving of the PSFCH, a redundant PSFCH in one slot based on at least one of a priority of a data packet indicated in the PSCCH corresponding to the PSFCH, a transmission type of the PSCCH/PSSCH corresponding to the PSFCH, HARQ feedback information carried by the PSFCH, Reference Signal Received Power (RSRP) measured on the PSCCH/PSSCH corresponding to the PSFCH, and the HARQ feedback mode used by the PSFCH.

Alternatively, when both of the PSFCH resource and the PSCCH/PSSCH resource are FDM, the feedback module may be configured to discard, when the transmitting of the PSCCH/PSSCH collides with the transmitting of the PSFCH, or when the transmitting of the PSCCH/PSSCH collides with the receiving of the PSFCH, or when the receiving of the PSCCH/PSSCH on the reserved resource collides with the transmitting of the PSFCH, the PSCCH/PSSCH or the PSFCH in one slot based on at least one of a priority of a data packet indicated within the PSCCH corresponding to the PSFCH, a PSCCH/PSSCH resource allocation manner, a fact that whether the resource of the transmitted PSCCH/PSSCH is reserved in advance by SCI, a transmission type of the PSCCH/PSSCH corresponding to the PSFCH, HARQ feedback information carried by the PSFCH, and the HARQ feedback mode used by the PSFCH.

According to an embodiment of the disclosure, there is provided a computer readable storage medium stored with a computer program, when the computer program is executed by a processor, the HARQ feedback method according to the disclosure is implemented.

In accordance with another aspect of the disclosure, a UE, including a processor, a memory stored with a computer program, and when the computer program is executed by the processor, the HARQ feedback method disclosure is implemented.

In accordance with another aspect of the disclosure, HARQ feedback method is provided. The HARQ feedback method and the UE which performs the HARQ feedback method transmits a Physical Sidelink Control Channel (PSCCH)/Physical Sidelink Shared Channel (PSSCH) to a second UE, and receive a Physical Sidelink Feedback Channel (PSFCH) transmitted by the second UE through performing the HARQ feedback according to a decoding result of the PSCCH/PSSCH.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will become more apparent from the following description taken in conjunction with the accompanying drawings, in which.

Throughout the drawings, like reference numerals will be understood to refer to like parts, components, and structures.

DETAILED DESCRIPTION

Figure 1:
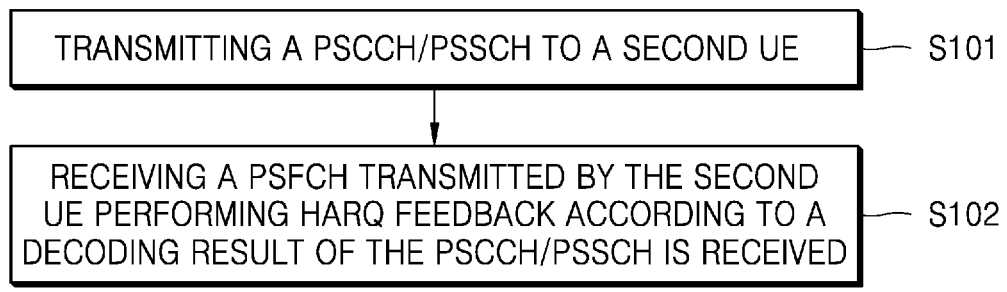
FIG. 1 illustrates a flowchart of an HARQ feedback method, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It will be understood that the singular forms "a", "an", and "the" include the plural referents unless the context clearly indicates otherwise. It will be further understood that the phrase "comprise" refers to the presence of stated features, integers, steps, operations, elements, and/or components, but do not preclude the presence or addition of one or more other features, integers, steps, operations, elements, components, and/or groups thereof. It will be understood that, when an element is referred to as being "connected" or "coupled" to another element, it may be directly connected or coupled to the other element, or there may be intermediate element. Further, "connected" or "coupled" as used herein may include either a wireless connection or a wireless coupling. The phrase "and/or" used herein includes all or any one and all combinations of one or more of the associated listed.

Those skilled in the art will understood that, all terms (including technical terms and scientific terms) used herein have the same meaning as commonly understood by one of ordinary skill in the art to which the invention belongs, unless otherwise defined. It should also be understood that, terms such as those defined in a general dictionary should be understood to have meaning consistent with the meaning in the context of the prior art, and will not be explained by idealized or overly formal meaning unless specifically defined as here.

Those skilled in the art may understand that, the "terminal" and "user equipment" used herein may not only be an equipment including a wireless signal receiver, that is, an equipment having only a wireless signal receiver without transmitting capability, but also an equipment including hardware for transmitting and receiving, that is, an equipment having hardware for receiving and transmitting and being capable of conducting a bidirectional communication over a bidirectional communication link. Such equipment may include a cellular communication equipment or other type of communication equipment which includes a single line display or a group-line display or without a group-line display, a Personal Communications Service (PCS) which may combine functions of voice processing, data processing, fax, and/or data communication, a Personal Digital Assistant (PDA) which may include a radio frequency receiver, a pager, Internet/Intranet access, a web browser, a notepad, a calendar, and/or a Global Positioning System (GPS) receiver, and a conventional laptop and/or a palmtop computer or other equipment which is a conventional laptop or palmtop computer or other equipment having and/or including a radio frequency receiver. The "terminal", "user equipment" used herein may be portable, transportable, installed in a vehicle (aviation, navigation and/or land), or adapted and/or configured to operate locally, and/or executed in any other location on the earth and/or space in a distributed form. The "terminal" and "user equipment" used herein may also be a communication terminal, an internet terminal, a music/video playing terminal, and may be, for example, a PDA, a Mobile Internet Device (MID), and/or a mobile phone with a music/video display function, and may also be a smart TV, a set-top box and the like.

In the 3GPP LTE standard, a direct communication link between User Equipments (UEs) is referred to as sidelink (SL). Similar to an uplink (UL) and a downlink (DL), a sidelink includes a control channel and a data channel, among which the former is referred to as Physical Sidelink Control Channel (PSCCH), and the latter is referred to as Physical Sidelink Shared Channel (PSSCH). The PSCCH is used to indicate information regarding a time-frequency domain resource location, a modulation and coding mode and the like of PSSCH transmission, and the PSSCH is used to carry data.

Two types of sidelink communication mechanisms are defined in the 3GPP LTE standard, namely, Device to Device (D2D) and Vehicle to Vehicle/Pedestrian/Infrastructure/Network (hereinafter referred to as V2X) based on the sidelink. The V2X has better performance than the D2D in terms of data rate, time delay and reliability, so the V2X has become the most representative sidelink communication technology in the current 3GPP LTE standard.

From the perspective of resource allocation mechanism, an existing LTE V2X technology includes two modes, namely, a resource allocation mode based on base station scheduling (Mode 3) and a resource allocation mode in which the UE makes selection autonomously (Mode 4). For Mode 3, the UE determines the transmitting resource on the sidelink channel allocated by the base station by receiving the downlink control channel of the base station, and the mutual interference between the transmission resources of different UEs may be minimized by an appropriate base station scheduling policy. For Mode 4, the base station does not participate in a specific resource allocation, and the UE determines the optimal transmitting resource by detecting the channel. Since the existing LTE V2X technology is mainly used to support the broadcast service in initial design, a broadcast transmission mode is used in Mode 3 and Mode 4 at the physical layer, that is, the physical channel transmitted by the UE is received and decoded by all UEs within a certain range. In the current LTE sidelink communication system, the receiving UE (RX UE) does not need to feed back the Hybrid Automatic Repeat Request Acknowledgement (HARQ-ACK) information and channel state information to the transmitting UE (TX UE), and the HARQ-ACK feedback can be an ACK feedback or a NACK feedback. This implementation manner is beneficial to reduce the complexity of the whole system, but the transmission efficiency and the reliability of transmission are also affected.

In a 3GPP 5G New Radio (NR) system, V2X is one of the Rel-16 NR standard Work Items (WI). In the NR V2X system, in order to support more data service types, sidelink communication supports the groupcast service (i.e., the physical channel transmitted by the UE is received and decoded by a group of UEs within a certain range) and the unicast service (i.e., the physical channel transmitted by the UE is received and decoded by another UE within a certain range), as well as the broadcast service. In order to improve the reliability and the transmission efficiency of sidelink data transmission, both the groupcast service and the unicast service need to support the HARQ feedback, that is, the RX UE should feed back the decoding result of the PSCCH/PSSCH to the TX UE, and introduce a new channel for feeding back the HARQ-ACK, that is, the Physical Sidelink Feedback Channel (PSFCH), but the relevant technical details are still not clear, the application mainly proposes possible solutions for relevant technical details.

The first UE may also be referred to as TX UE, which is a TX UE that performs the receiving of Hybrid Automatic Repeat Request (HARQ) feedback, that is, the first UE is a subject that receives the HARQ feedback. And the second UE may also be referred to as RX UE, which is an RX UE that performs the transmitting of HARQ feedback, that is, the second UE is a subject that transmits the HARQ feedback.

FIG. 1 illustrates a flowchart of a HARQ feedback method, performed by a first user terminal UE, according to an embodiment of the disclosure. The HARQ feedback method in the embodiments of the disclosure may be applied to unicast/groupcast HARQ feedback in an NR V2X system (for example, a 5G NR V2X system).

Referring to FIG. 1, in step S101, a PSCCH/PSSCH is transmitted to a second UE.

In step S102, a PSFCH, which is transmitted by the second UE through performing HARQ feedback according to the decoding result of the PSCCH/PSSCH, is received.

Figure 2:
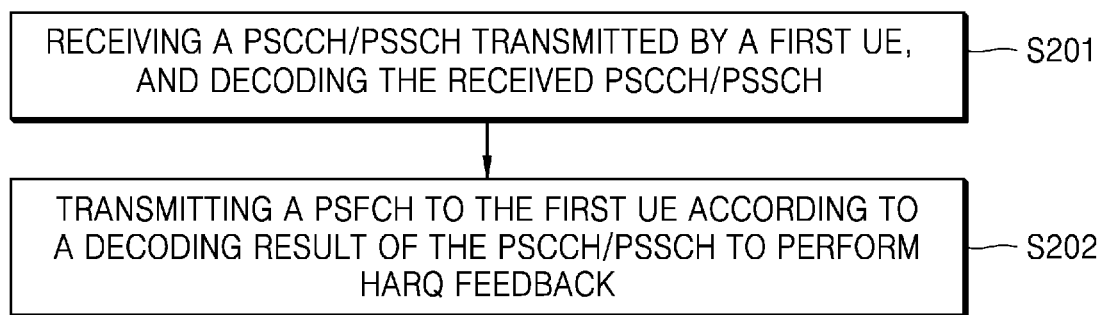
FIG. 2 illustrates a flowchart of an HARQ feedback method, according to an embodiment of the disclosure.

FIG. 2 illustrates a flowchart of an HARQ feedback method, performed by a second UE, according to an embodiment of the disclosure.

Referring to FIG. 2, in step S201, a PSCCH/PSSCH transmitted by a first UE is received, and the received PSCCH/PSSCH is decoded.

In step S202, a PSFCH is transmitted to the first UE according to the decoding result of the PSCCH/PSSCH to perform HARQ feedback.

In an NR V2X system, there are a plurality of sub-channels in one slot, and an RX UE attempts to receive and decode PSCCHs/PSSCHs on each sub-channel in one slot, that is, the RX UE may simultaneously receive and decode a plurality of unicast PSCCHs/PSSCHs and/or groupcast PSCCHs/PSSCHs from different TX UEs in one slot. When these unicast and/or groupcast transmissions are configured to use the HARQ feedback function, the RX UE may face a problem of simultaneously transmitting the plurality of PSFCHs in one slot. Resources of the plurality of PSFCHs may be Frequency Division Multiplexing (FDM) and/or Code Division Multiplexing (CDM), and simultaneously transmitting a plurality of PSFCHs has certain requirements on the hardware capabilities of the RX UE. In addition, simultaneously transmitting a plurality of PSFCHs also affects the transmission reliability of the PSFCH, since the maximum transmitting power of the RX UE is fixed, and when a plurality of PSFCHs are simultaneously transmitted, a maximum transmitting power for each PSFCH has to be reduced, and thus the reliability of PSFCH transmission is affected.

When the RX UE needs to simultaneously transmit a plurality of PSFCHs in one slot, a maximum number of PSFCHs simultaneously transmitted by the RX UE is pre-defined or pre-configured by system, and may also be related to capability of the RX UE, and the number of PSFCHs actually transmitted by the RX UE in the same slot should not exceed the maximum number that the RX UE can support.

As an example, the RX UE performs open-loop power control based on a sidelink pathloss and/or based on a downlink pathloss on a PSFCH, and the number of PSFCHs actually transmitted by the RX UE in the same slot is affected by a total transmitting power, and the RX UE calculates the open-loop transmitting power of each PSFCH based on a loop power control algorithm. If the total transmitting power of the plurality of PSFCHs does not exceed a maximum rated transmitting power of the RX UE, the RX UE may simultaneously transmit the plurality of PSFCHs in the same slot, and if the total transmitting power of the plurality of PSFCHs exceeds the maximum rated transmitting power of the RX UE, the RX UE may transmit the PSFCHs using at least one of the following methods:

In a first method, the RX UE only guarantees that some PSFCHs are transmitted with full power, that is, the RX UE transmits some PSFCHs with the calculated open-loop transmitting power, and discards other PSFCHs for which full power transmission cannot be guaranteed. The RX UE sorts the PSFCH based on a predefined priority, and transmits higher priority PSFCHs with a full power and discards lower priority PSFCHs. For example, the PSFCH, the priority of whose data packet indicated by the PSCCH is the highest, is transmitted with full power preferentially, or, the PSFCH with the lowest or highest open-loop transmitting power value is transmitted with full power. If the open-loop transmitting power of each PSFCH exceeds the maximum rated transmitting power of the RX UE, the RX UE should transmit one of the PSFCHs at the maximum rated transmitting power, and the RX UE determines which one PSFCH should be transmitted with the maximum rated transmitting power based on a predefined priority. For example, the PSFCH, the priority of whose data packet indicated by the PSCCH is the highest, is transmitted with the maximum rated transmitting power preferentially, or the PSFCH with the lowest open-loop transmitting power value is transmitted with the maximum rated transmitting power preferentially.

In a second method, the RX UE only guarantees that some PSFCHs are transmitted with full power, that is, the RX UE transmits some PSFCHs with the calculated open-loop transmitting power. If there is remaining power after the full power transmission of some PSFCHs has been satisfied, the RX UE should attempt to transmit one PSFCH with remaining power, that is, the actual transmitting power of the one PSFCH is reduced relative to the open-loop transmitting power, and the reduction factor is defined as the ratio of the actual transmitting power to the open-loop transmitting power. The RX UE sorts the PSFCH based on a predefined priority, and transmits higher priority PSFCHs with a full power and discards lower priority PSFCHs, or transmits the lower priority PSFCHs with reduced power. As an example, the system has a minimum limit on the available reduction factors, which may be predefined or pre-configured, and the RX UE should discard the PSFCHs when the reduction factor exceeds the predefined or the pre-configured minimum value.

In a third method, the RX UE transmits the PSFCH in the maximum number of PSFCHs that can be supported, and performs power reduction on each transmitted PSFCH, and each PSFCH uses the same reduction factor, so that the total transmitting power of the power-reduced PSFCHs is the maximum rated transmitting power of the RX UE. For example, in the case that the RX UE needs to transmit two PSFCHs simultaneously, and the corresponding open-loop transmitting powers are P1 and P2, respectively, if the sum of the open-loop transmitting powers of the two PSFCHs exceeds the maximum rated transmitting power of the RX UE, that is, P1+P2>Pmax, then, the actual transmitting power after the reduction is P1*Pmax/(P1+P2) and P2*Pmax/(P1+P2), respectively, that is, the reduction factor is Pmax/(P1+P2). In this way, the sum of the actual transmitting power after the reduction is the maximum rated transmitting power of the RX UE. As an example, the system has a minimum limit on the available reduction factors, which may be predefined or pre-configured, and when the reduction factor exceeds the predefined or the pre-configured minimum value, the RX UE should discard one or more PSFCHs so that the reduction factors corresponding to other PSFCHs after the discard satisfy the minimum value requirement. The RX UE should discard the PSFCHs based on the predefined priority. For example, the PSFCH, the priority of whose data packet indicated by the PSCCH is the lowest, is discarded preferentially, or, the PSFCH with the highest open-loop transmitting power value is discarded preferentially.

As an example, the system may specify that the RX UE cannot simultaneously transmit a plurality of PSFCHs in one slot, so when the RX UE needs to simultaneously transmit a plurality of PSFCHs in one slot, the RX UE must discard certain PSFCHs. Or, the system may specify that the RX UE can simultaneously transmit a plurality of PSFCHs in one slot, but the maximum number of simultaneously transmitted PSFCHs is limited and is related to the capability of the RX UE. Considering hardware capabilities and PSFCH transmission reliability, the maximum number of PSFCHs simultaneously transmitted by the RX UE should be much smaller than the maximum number of PSCCH/PSSCHs simultaneously received and decoded, and therefore, the number of PSFCHs that the RX UE needs to simultaneously transmit in one slot may still exceed the maximum number supported by the RX UE, and then the RX UE must discard some PSFCHs. When the above PSFCH discard occurs, the RX UE should determine which PSFCH to discard based on a predefined priority. In addition, since V2X is a half-duplex system, the V2X UE cannot receive the PSFCH and transmit the PSFCH simultaneously, and when the receiving of the PSFCH collides with the transmitting of the PSFCH, the RX UE should determine which PSFCH to discard based on the predefined priority.

As an example, when the number of simultaneously transmitted PSFCHs in one slot exceeds the maximum number supported by the RX UE, or when the transmitting of the PSFCH collides with the receiving of the PSFCH, the RX UE may determine which one PSFCH to discard according to the priority of the data packet indicated in Sidelink Control Information (SCI), that is, the RX UE determines which PSFCH to discard based on ProSe Per-Packet Priority (PPPP). For example, the PSFCH corresponding to the PSSCH with higher priority may be transmitted preferentially, and the PSFCH corresponding to the PSSCH with lower priority may be discarded, that is, the PSFCH corresponding to a PSSCH with higher priority have a higher priority than the PSFCHs corresponding to a PSSCH with lower priority. When the data packets have the same priority, the RX UE determines which PSFCH to discard depending on the implementation of the RX UE.

As an example, when the number of simultaneously transmitted PSFCHs in one slot exceeds the maximum number supported by the RX UE, or when the transmitting of the PSFCH collides with the receiving of the PSFCH, the RX UE may determine which one PSFCH to discard according to type of data transmission. For example, the PSFCHs of the unicast PSCCH/PSSCH are transmitted preferentially, and the PSFCHs of the groupcast PSCCH/PSSCH are discarded, that is, the PSFCHs of the unicast PSCCH/PSSCH have a higher priority than the PSFCHs of the groupcast PSCCH/PSSCH.

As an example, when the number of simultaneously transmitted PSFCHs in one slot exceeds the maximum number supported by the RX UE, or when the transmitting of the PSFCH collides with the receiving of the PSFCH, the RX UE may determine which PSFCH to discard according to information carried by PSFCH. For example, an NACK feedback may be transmitted preferentially, and an ACK feedback is discarded, that is, the NACK feedback has a higher priority than the ACK feedback. This is because discarding the NACK is worse than discarding the ACK, as discarding the ACK will cause unnecessary PSSCH retransmission, but discarding the NACK will cause packet loss.

As an example, when the number of simultaneously transmitted PSFCHs in one slot exceeds the maximum number supported by the RX UE, or when the transmitting of the PSFCH collides with the receiving of the PSFCH, the RX UE may determine which one PSFCH to discard according to HARQ feedback mode of groupcast transmission. For example, the RX UE may transmit a ACK/NACK of a second HARQ feedback mode preferentially, and discard a NACK feedback of a first HARQ feedback mode, that is, the ACK/NACK feedback of the second HARQ feedback mode has a higher priority than the NACK feedback of the first HARQ feedback mode. This is because that the second HARQ feedback mode is suitable for services requiring higher transmission reliability, and the corresponding PSFCH should have higher priority.

As an example, when the number of simultaneously transmitted PSFCHs in one slot exceeds the maximum number supported by the RX UE, or when the transmitting of the PSFCH collides with the receiving of the PSFCH, the RX UE may determine which PSFCH to discard according to the Reference Signal Receiving Power (RSRP) measured on the received PSCCH/PSSCH. For example, the PSFCH corresponding to a PSCCH/PSSCH with a higher RSRP value may be transmitted preferentially, and the PSFCH corresponding to a PSCCH/PSSCH with a lower RSRP value is discarded, that is, the PSFCH corresponding to the PSCCH/PSSCH with the higher RSRP value have a higher priority than the PSFCH corresponding to the PSCCH/PSSCH with the lower RSRP value.

As an example, when the number of simultaneously transmitted PSFCHs in one slot exceeds the maximum number supported by the RX UE, or when the transmitting of the PSFCH collides with the receiving of the PSFCH, the RX UE may determine which PSFCH to discard according to any one or more of the priority of the transmitted data packet (a priority indicated in the SCI), type of data transmission (unicast or groupcast), information carried by PSFCH (ACK or NACK), HARQ feedback mode of groupcast transmission, and RSRP value measured on PSCCH/PSSCH. For example, the RX UE may make determination firstly according to the priority of the transmitted data packet, and if the transmitted data packets have the same priority, then make determination according to the RSRP value measured on PSCCH/PSSCH.

In an NR V2X system, if both of the PSFCH and the PSCCH/PSSCH in one resource pool are FDM, the RX UE may need to simultaneously transmit the PSCCH/PSSCH and the PSFCH in one slot. Due to the power limitation, the system stipulates that the RX UE cannot simultaneously transmit the PSCCH/PSSCH and the PSFCH, and when the transmitting of the PSCCH/PSSCH collides with the transmitting of the PSFCH, the RX UE should determine which physical sidelink channel to discard based on a predefined priority.

In an NR V2X system, if both of the PSFCH and the PSCCH/PSSCH in one resource pool are FDM, the RX UE may need to simultaneously receive the PSCCH/PSSCH and transmit the PSFCH in one slot. Since V2X is a half-duplex system, a V2X UE cannot simultaneously receive the PSCCH/PSSCH and transmit the PSFCH, and when the receiving of the PSCCH/PSSCH collides with the transmitting of the PSFCH, the RX UE should determine which one to discard based on a predefined priority. Here, the receiving of the PSCCH/PSSCH refers to receiving and decoding the PSCCH/PSSCH on reserved resources, that is, the received and decoded PSCCH/PSSCH has indicated information of the reserved resources through the SCI in advance, instead of attempting blind receiving and decoding on each subchannel. If the PSCCH/PSSCH received and decoded on the reserved resources is a retransmission and the corresponding initial transmission has been successfully decoded, there is no need to receive the PSCCH/PSSCH retransmission.

In an NR V2X system, if both of the PSFCH and the PSCCH/PSSCH in one resource pool are FDM, the RX UE may need to simultaneously transmit the PSCCH/PSSCH and receive the PSFCH in one slot. Since V2X is a half-duplex system, a V2X UE cannot simultaneously transmit the PSCCH/PSSCH and receive the PSFCH, and when the transmitting of the PSCCH/PSSCH collides with the receiving of the PSFCH, the RX UE should determine which one to discard based on a predefined priority. Here, the receiving of the PSFCH refers to receiving the PSFCH on the reserved resources. Since the PSFCH resources have a mapping relationship with the corresponding PSCCH/PSSCH resources, the RX UE expects to receive the PSFCH on a certain resource in a later slot when transmitting the PSCCH/PSSCH.

As an example, when the transmitting of the PSCCH/PSSCH collides with the transmitting of the PSFCH, or, when the transmitting of the PSCCH/PSSCH collides with the transmitting of the PSFCH on a reserved resource, or, when the transmitting of the PSCCH/PSSCH collides with the receiving of the PSFCH, the transmitting/receiving of the PSCCH/PSSCH may have a higher priority than the transmitting/receiving of the PSFCH, that is, the RX UE transmits/receives the PSCCH/PSSCH preferentially and discards the transmitting/receiving of the PSFCH.

As an example, when the transmitting of the PSCCH/PSSCH collides with the transmitting of the PSFCH, or, when the transmitting of the PSCCH/PSSCH collides with the transmitting of the PSFCH on a reserved resource, or, when the transmitting of the PSCCH/PSSCH collides with the receiving of the PSFCH, the RX UE may determine which physical sidelink channel to discard according to the priority of a corresponding data packet. For example, associated sidelink physical channels of higher priority data packets are transmitted preferentially, and associated sidelink physical channels of lower priority data packets are discarded. If the data packet of the PSCCH/PSSCH has a higher priority than the data packet of the PSCCH/PSSCH corresponding to the PSFCH, then the PSCCH/PSSCH is transmitted/received preferentially, and the transmitting/receiving of the PSFCH is discarded. Otherwise, the PSFCH is transmitted/received preferentially, and the transmitting/receiving of the PSCCH/PSSCH is discarded. When some of the data packets have the same priority, the RX UE determines which physical sidelink channel to discard depending on the implementation of the RX UE.

As an example, when the transmitting of the PSCCH/PSSCH collides with the transmitting of the PSFCH, the RX UE may determine which physical sidelink channel to discard according to a PSCCH/PSSCH resource allocation manner. For example, in transmission mode 1, the PSCCH/PSSCH resources are allocated by the base station, and accordingly the PSCCH/PSSCH is transmitted preferentially; in transmission mode 2, the PSCCH/PSSCH resources are allocated by the RX UE autonomously, so the resource allocation of PSCCH/PSSCH should avoid the transmitting time of PSFCH. If there are other available resources within a data transmission delay, the PSFCH is transmitted preferentially, and other available resources are allocated for data to be transmitted. If there is no other available resource in a data transmission delay, the resource allocation of PSCCH/PSSCH cannot avoid the transmitting time of PSFCH, so the PSCCH/PSSCH is transmitted preferentially.

As an example, when the transmitting of the PSCCH/PSSCH collides with the transmitting of the PSFCH, the RX UE determines which physical sidelink channel to discard according to whether the PSCCH/PSSCH resources are indicated to be reserved in advance. For example, in the transmission mode 2, if the PSCCH/PSSCH resources are indicated to be reserved in advance by the SCI, then the PSCCH/PSSCH is transmitted preferentially; if the PSCCH/PSSCH resources are not indicated to be reserved in advance by the SCI, and there are other available resources within the data transmission delay, then the PSFCH is transmitted preferentially, and other available resources are allocated for the data to be transmitted; and if the PSCCH/PSSCH resources are not indicated to be reserved in advance by the SCI, and there are no other available resources within the data transmission delay, the PSCCH/PSSCH is transmitted preferentially.

As an example, when the transmitting of the PSCCH/PSSCH collides with the transmitting of the PSFCH, or, when the transmitting of the PSCCH/PSSCH collides with the transmitting of the PSFCH on a reserved resource, or, when the transmitting of the PSCCH/PSSCH collides with the receiving of the PSFCH, the RX UE may determine which physical sidelink channel to discard according to a corresponding transmission type of the PSCCH/PSSCH. For example, a unicast transmission has a higher priority than a groupcast transmission, and a groupcast transmission has a higher priority than a broadcast transmission.

In addition, different sidelink physical channels of the same transmission type may also have different priorities. For example, a unicast PSFCH has a higher priority than a unicast PSCCH/PSSCH, a unicast PSCCH/PSSCH has a higher priority than a groupcast PSFCH, and a groupcast PSFCH has a higher priority than a groupcast PSCCH/PSSCH.

As an example, when the transmitting of the PSCCH/PSSCH collides with the transmitting of the PSFCH, or, when the transmitting of the PSCCH/PSSCH collides with the transmitting of the PSFCH on a reserved resource, or, when the transmitting of the PSCCH/PSSCH collides with the receiving of the PSFCH, the RX UE may determine which physical sidelink channel to discard according to whether the PSCCH/PSSCH is an initial PSCCH/PSSCH transmission or a PSCCH/PSSCH retransmission. For example, the initial PSCCH/PSSCH transmission has a higher priority than the PSFCH, and the PSFCH has a higher priority than the PSCCH/PSSCH retransmission.

As an example, when the transmitting of the PSCCH/PSSCH collides with the transmitting of the PSFCH, or, when the transmitting of the PSCCH/PSSCH collides with the transmitting of the PSFCH on a reserved resource, the RX UE may determine which physical sidelink channel to discard according to feedback information carried by the PSFCH. For example, if the feedback information carried by the PSFCH is an ACK, the PSCCH/PSSCH is transmitted preferentially, that is, the transmitting of the PSCCH/PSSCH has a higher priority than the transmitting of the ACK; if the feedback information carried by the PSFCH is a NACK, the PSFCH is transmitted preferentially, that is, the transmitting of the NACK has a higher priority than the transmitting of the PSCCH/PSSCH, and other available resources are allocated for data to be transmitted.

As an example, when the transmitting of the PSCCH/PSSCH collides with the transmitting of the PSFCH, or, when the transmitting of the PSCCH/PSSCH collides with the transmitting of the PSFCH on a reserved resource, or, when the transmitting of the PSCCH/PSSCH collides with the receiving of the PSFCH, the RX UE may determine which physical sidelink channel to discard according to any one or more of the priority of corresponding data packet, the PSCCH/PSSCH resource allocation manner, whether the PSCCH/PSSCH resources are indicated to be reserved in advance, the corresponding transmission type of the PSCCH/PSSCH (for example, unicast, groupcast, or broadcast), whether the transmitting of the PSCCH/PSSCH is an initial transmission or a retransmission, and the feedback information carried by the PSFCH. For example, the RX UE may make determination firstly according to the priority of corresponding data packet, and then according to the corresponding transmission type of the PSCCH/PSSCH if corresponding data packets have the same priority, and then according to the PSCCH/PSSCH resource allocation manner if the corresponding transmission type of the PSCCHs/PSSCHs are the same.

Figure 3:
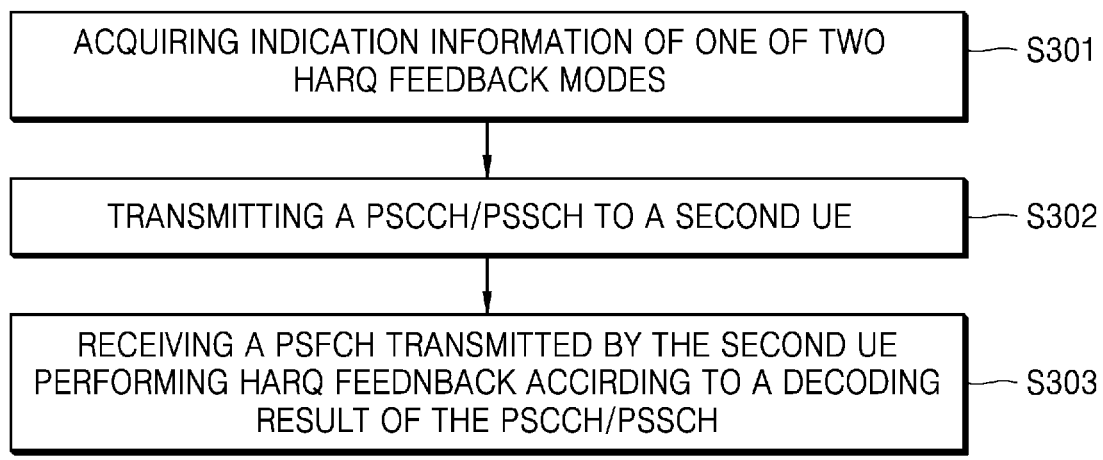
FIG. 3 illustrates a flowchart of an HARQ feedback method, according to an embodiment of the disclosure.

FIG. 3 illustrates a flowchart of an HARQ feedback method, performed by a first UE, according to an embodiment of the disclosure. The HARQ feedback method in FIG. 3 may be a groupcast HARQ feedback method for the 5G NR V2X system, which is applicable to a groupcast transmission in a sidelink communication system.

Figure 4:
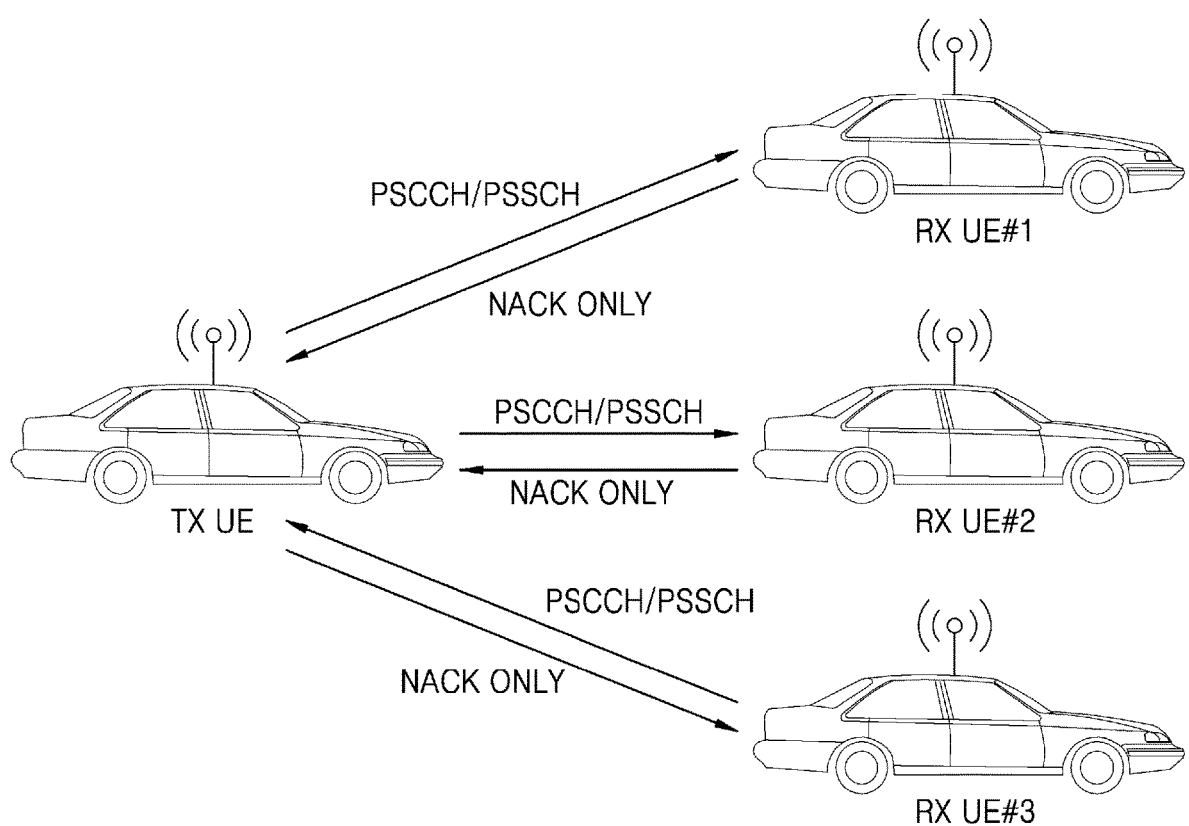
FIG. 4 illustrates a schematic diagram of a first HARQ feedback mode according to an embodiment of the disclosure.

FIG. 4 illustrates a schematic diagram of a first HARQ feedback mode according to an embodiment of the disclosure.

Figure 5:
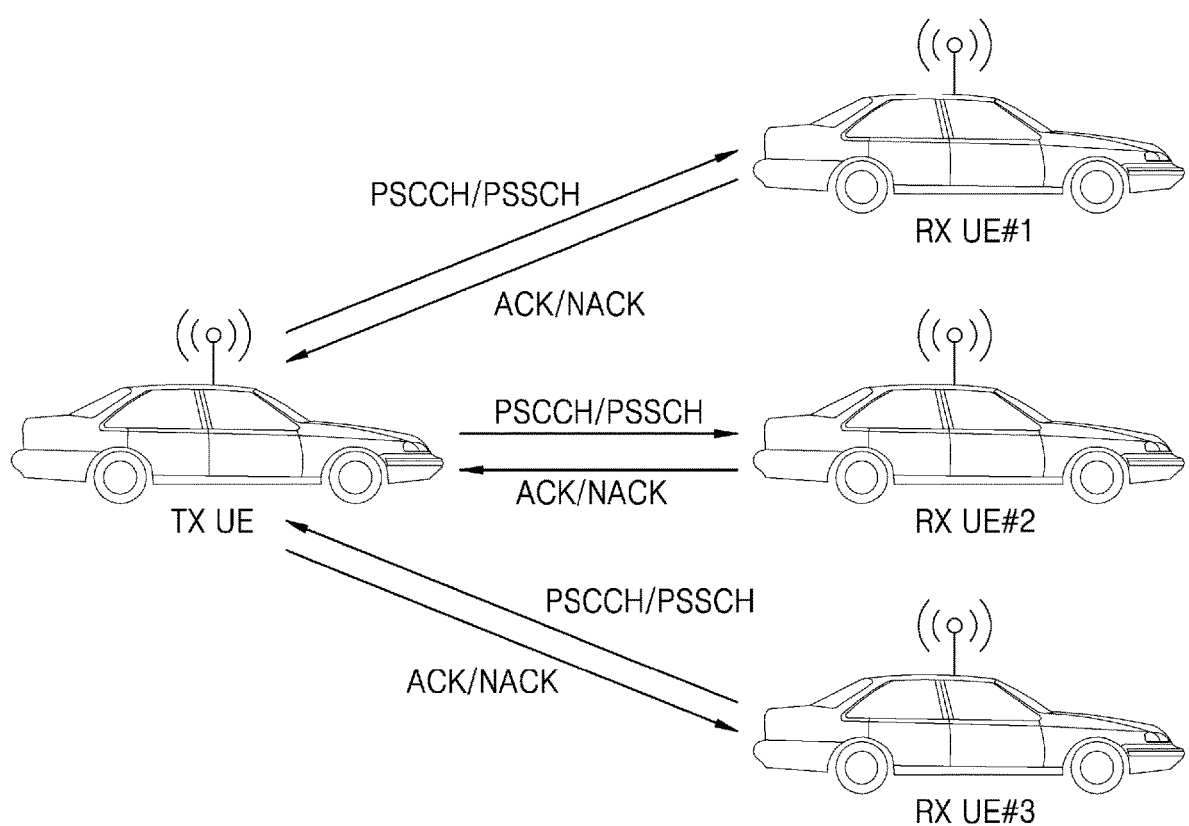
FIG. 5 illustrates a schematic diagram of a second HARQ feedback mode according to an embodiment of the disclosure.

FIG. 5 illustrates a schematic diagram of a second HARQ feedback mode according to an embodiment of the disclosure.

The groupcast transmission in the sidelink communication system means that the sidelink transmission is received and decoded by a group of RX UEs, that is, the number of RX UEs is at least more than one. In the groupcast transmission, the Sidelink Control Information (SCI) carried by the PSCCH includes indication information of a destination group ID, and all UEs belonging to the destination group ID should receive and decode the PSSCH corresponding to the SCI. The destination group ID indicated in the SCI is generated by the destination group ID of upper layer. For example, the destination group ID indicated in the SCI is obtained by truncating the destination group ID of the upper layer, or is obtained by calculating according to a predefined rule.

Referring to FIG. 3, in step S301, indication information of one of two HARQ feedback modes is acquired.

Referring to FIG. 4, the groupcast may support two HARQ feedback modes. A first HARQ feedback mode is a mode in which the second UE only feeds back the NACK, and a second HARQ feedback mode is a mode in which the second UE feeds back the ACK/NACK. In the first HARQ feedback mode, the RX UE (i.e., the second UE) only feeds back the NACK, that is, when the RX UE successfully decodes the PSSCH, no feedback is needed, and only when the RX UE fails to decode the PSSCH, the NACK is fed back. If the feedback received by the TX UE (i.e., the first UE) is the NACK, a PSSCH retransmission is initiated. If the TX UE does not receive the NACK feedback, all the RX UEs are regarded as having successfully decoded the PSSCH, and no PSSCH retransmission will be initiated. Here, the TX UE cannot actually distinguish between Discontinuous Transmission (DTX) and ACK. For example, when the TX UE does not receive the NACK, the RX UE may successfully decode the PSSCH, or the RX UE may not successfully decode the PSCCH. If the RX UE may not successfully decode the PSCCH, DTX occurs, and since the TX UE does not initiate the PSSCH retransmission, data packet loss occurs at the RX UE side.

In the first HARQ feedback mode, as long as the TX UE receives NACK feedback, the PSSCH retransmission is initiated without distinguishing by which RX UE the NACK is fed back. For example, all RX UEs in the group may use the same PSFCH resource to feedback the NACK, that is, all RX UEs share the same PSFCH resource, thereby saving the overhead of the PSFCH resource and improving the resource usage efficiency. The PSFCH resource herein and the PSFCH resource described below all refer to one PSFCH code domain resource mapped to one time-frequency domain PSFCH resource.

However, a plurality of RX UEs feeding back the NACK on the same PSFCH resource may cause a destructive channel accumulation effect. Since the PSFCH signals transmitted by different RX UEs undergo different channel phases, the phase of signal superimposed by PSFCHs fed back by the plurality of RX UEs received by the TX UE may be just zero, thereby causing devastating damage to the PSFCH channel detection. In order to reduce the destructiveness of the channel accumulation effect, as an example, all RX UEs in a group may be divided into a plurality of sub-groups, different sub-group RX UEs use different PSFCH resources to feed back the NACK, and RX UEs in the same sub-group use the same PSFCH resource to feed back the NACK, that is, RX UEs in one sub-group share the same PSFCH resource, thereby reducing the number of RX UEs that use the same PSFCH resource to feed back the NACK, to reduce the destructiveness of the channel accumulation effect. As an example, all RX UEs in a group may share a plurality of PSFCH resources, and an RX UE randomly selects one of the plurality of PSFCH resources for feeding back the NACK. Since the number of PSFCH resources is much smaller than the number of RX UEs, the overhead of the plurality of PSFCH resources is saved, and the efficiency of resource utilization is improved.

Referring to FIG. 5, in the second HARQ feedback mode, an RX UE feeds back an ACK or an NACK, that is, the ACK is fed back when the RX UE successfully decodes the PSSCH, and NACK is fed back when the RX UE fails to decode the PSSCH. If the feedback from all RX UEs received by the TX UE is an ACK, then all RX UEs are regarded as having successfully decoded the PSSCH and no PSSCH retransmission will be initiated. If the feedback of one of the RX UEs received by the TX UE is the NACK, a PSSCH retransmission will be initiated. If the TX UE can detect that one of the RX UEs does not feed back any of the ACK and the NACK, then the RX UE is regarded as being unsuccessful in decoding the PSCCH, that is, DTX occurs, and then the PSSCH retransmission is also initiated. Here, the case of data packet loss due to DTX can be avoided.

In the second HARQ feedback mode, as an example, different RX UEs may use different PSFCH resources to feed back the ACK or the NACK, that is, each RX UE is separately configured with a corresponding PSFCH resource, so that the TX UE can distinguish which UE has transmitted the PSFCH, and can distinguish whether the feedback is an ACK or an NACK, thereby avoiding data packet loss due to DTX.

Groupcast transmissions may be configured to use one of the two HARQ feedback modes described above.

As an example, when acquiring the indication information of one of the two HARQ feedback modes, the HARQ feedback mode indicated by the UE specific Radio Resource Control (RRC) signaling from a serving base station of the first UE may be acquired, or, the HARQ feedback mode indicated by sidelink pre-configuration parameters may be acquired, or, the HARQ feedback mode is determined according to a predefined rule. When determining the HARQ feedback mode according to the predefined rule, the HARQ feedback mode may be determined according to the type of the group to which the UEs in the groupcast transmission belong, wherein the first HARQ feedback mode is used when the type of the group to which the UEs belong in the groupcast transmission is connection-less. And/or, the second HARQ feedback mode is determined according to the number of members in the group to which UEs in the groupcast transmission belong, wherein the first HARQ feedback mode is used when the number of members in the group to which UEs in the groupcast transmission belong is greater than a number of PSFCH resources corresponding to one PSCCH resource. And/or, the HARQ feedback mode is determined according to QoS of a data service, wherein the second HARQ feedback mode is used for the data service whose QoS requirement is within a preset range.

As an example, a TX UE (and a group of RX UEs) is semi-statically configured to use one of the two HARQ feedback modes described above.

As an example, which one of the above two HARQ feedback modes is used by the groupcast transmission may be indicated by the configuration information of the resource pool, and the sidelink physical channel transmission is based on the configured resource pool, that is, all groupcast transmissions on the same resource pool should use the same HARQ feedback mode. In other words, the groupcast transmission using the first HARQ feedback mode and the groupcast transmission using the second HARQ feedback mode cannot share the same resource pool. For the TX UE, the HARQ feedback mode is determined by transmitting the configuration information of the resource pool, and for the RX UE, the HARQ feedback mode is determined by receiving the configuration information of the resource pool.

As an example, the configuration information of the resource pool may include 1 bit for explicitly indicating which of the above two HARQ feedback modes is used for the groupcast transmission on the resource pool.

As an example, the configuration information of the resource pool may implicitly indicate which one of the above two HARQ feedback modes is used for the groupcast transmission. For example, the HARQ feedback mode for the groupcast transmission is implied by the mapping mode between the PSCCH resources and the PSFCH resources on the resource pool. When the mapping mode between the PSCCH resources and the PSFCH resources is configured as one-to-one mapping, that is, one PSCCH resource corresponds to one PSFCH resource, it implicitly indicates that the groupcast transmission uses the first HARQ feedback mode described above (i.e., NACK-only feedback mode). When the mapping mode between the PSCCH resources and the PSFCH resources is configured as one-to-many mapping, that is, one PSCCH resource corresponds to a plurality of PSFCH resources, it implicitly indicates that the groupcast transmission uses the second HARQ feedback mode (i.e., ACK/NACK feedback mode) described above.

As an example, which one of the above two HARQ feedback modes is used by the groupcast transmission may be independent of the configuration information of the resource pool, that is, different groupcast transmissions on the same resource pool may use different HARQ feedback modes. In other words, the groupcast transmission using the first HARQ feedback mode and the groupcast transmission using the second HARQ feedback mode may share the same resource pool.

As an example, which one of the above two HARQ feedback modes is used by the groupcast transmission may be indicated by the configuration information of the group to which the UEs in the groupcast transmission belong, and the configuration information of the group is configured by the upper layer or generated by the application layer when the group is being established. The configuration information of the group includes the type of the group, the ID of the member UE in the group, the group ID, and the used HARQ feedback mode etc, and the configuration information of the group is issued to the MAC layer and/or the physical layer by the upper layer or the physical layer of the UE. The TX UE and the RX UE belong to the same group, and the acquired configuration information of the group is the same.

As an example, which one of the above two HARQ feedback modes is used by the groupcast transmission may be configured by a specific high-layer signaling, and one UE can simultaneously belong to a plurality of groups, that is, a plurality of simultaneous groupcast transmissions can be supported, and the HARQ feedback mode of each group may be separately configured by the specific high layer signaling. If the UE is within coverage of a 5G NR cellular network, the In Coverage (IC) UE may be configured by the base station of the serving cell through a UE-specific RRC signaling, and if the UE is out of coverage of the 5G NR cellular network, the Out of Coverage (OOC) UE may be indicated by a pre-configured specific sidelink high-level parameter, that is, the configured value is hard coded when the UE is manufactured.

As an example, which one of the above two HARQ feedback modes is used by the groupcast transmission may be determined by the TX UE itself, and the HARQ feedback mode should be determined by the physical layer and/or the MAC layer of the TX UE. For example, the TX UE determines the HARQ feedback mode based on parameters issued by the upper layer or the application layer and/or determines the HARQ feedback mode by using predefined rules.

As an example, the TX UE may determine the HARQ feedback mode according to the type of the group issued by the upper layer or the application layer. There are two types of group, one type is referred to as connection-less in which the number of RX UEs in the group cannot be fixed, and the other type is referred to as connection-oriented in which the number of RX UEs in the group is fixed. For a connection-less group, even if the RX UE supports ACK feedback, the TX UE cannot distinguish whether or not the PSSCH is successfully decoded by all RX UEs in the group, so there is no need to feed back the ACK, and the second HARQ feedback mode is not applicable to the connection-less group. The system may specify that the connection-less groupcast transmission should use the first HARQ feedback mode described above, the connection-oriented groupcast transmission should use the second HARQ feedback mode described above, or may use any of the above two HARQ feedback modes.

As an example, the TX UE may determine the HARQ feedback mode according to the number of RX UEs in the group issued by the upper layer or the application layer. The system may specify that if the number of RX UEs of the group is not fixed, or the number of RX UEs in the group is greater than a threshold value, the corresponding groupcast transmission should use the first HARQ feedback (NACK-only feedback) mode described above, and if the number of the RX UEs in the group is less than one threshold, then the corresponding groupcast transmission should use the second HARQ feedback mode described above, or use any one of the above two HARQ feedback modes. The threshold values for the number of RX UEs used herein to determine which HARQ feedback mode to use may be predefined or pre-configured, or may be implied by other parameters. The system may use the number of PSFCH resources corresponding to one PSCCH resource as the threshold of the number of RX UEs. For example, one PSCCH resource has a mapping relationship with N PSFCH resources, and N is a predefined or pre-configured value and may be used as the threshold for the number of RX UEs described herein.

As an example, the TX UE may determine the HARQ feedback mode according to the group ID issued by the upper layer or the application layer. The system may specify that the group ID within a predefined or pre-configured range uses the first HARQ feedback mode described above, and the group ID within another predefined or pre-configured range uses the second HARQ feedback mode described above, that is, different ranges of group ID use different HARQ feedback modes.

As an example, the TX UE determines the HARQ feedback mode according to the QoS of the data service, and the second HARQ feedback mode has a higher lower limit of the transmission reliability of PSSCH than the first HARQ feedback mode, that is, the second HARQ feedback mode is suitable for data services having a high QoS. The higher layer or the application layer issues a parameter indicating the QoS of the data service to the physical layer or the MAC layer, and the TX UE determines the HARQ feedback mode according to the issued parameter that indicates the QoS, wherein when the value of the issued parameter exceeds a certain threshold, the second HARQ feedback mode is used, otherwise, the first HARQ feedback mode is used, or any one of the two HARQ feedback modes described above is used.

As an example, the TX UE determines the HARQ feedback mode according to a combination of a plurality of factors among the type of the group, the number of RX UEs in the group, the group ID, and the QoS of the group data service.

As an example, which one of the two HARQ feedback modes described above can be used for groupcast transmission may be indicated in the System Information Block (SIB) of the sidelink system.

As an example, the TX UE (and a group of RX UEs) are dynamically configured to use one of the two HARQ feedback modes described above.

When the TX UE is configured to use the transmission mode 1 (i.e., the sidelink resource used by the TX UE is uniformly scheduled by the base station), the base station also indicates the HARQ feedback mode used by the groupcast transmission when the base station dynamically indicates the PDCCH/PSSCH resource by the DCI, for example, since the second HARQ feedback mode requires more PSFCH resources than the first HARQ feedback mode, when the number of PSFCH resources in the resource pool is insufficient, the base station may indicate that the groupcast transmission uses the first HARQ feedback mode in the DCI, when the number of PSFCH resources in the resource pool is sufficient, the base station may indicate that the groupcast transmission uses the second HARQ feedback mode in the DCI.

When the TX UE is configured to use transmission mode 2 (i.e., the PSCCH/PSSCH resources used by the TX UE are autonomously selected by the TX UE), the TX UE determines the HARQ feedback mode used for groupcast transmission based on a Channel Busy Ratio (CBR) and/or a PSCCH-PSFCH mapping criteria used by the selected sidelink resource.

As an example, when the CBR exceeds a predefined or pre-configured threshold, the groupcast transmission can use the second HARQ feedback mode that is more reliable but consumes more PSFCH resources, and when the CBR is lower than the predefined or pre-configured For the threshold, the groupcast transmission may use the first HARQ feedback mode that is slightly less reliable but consumes less PSFCH resources.

As an example, a part of the PSCCH/PSSCH resources in the same resource pool are mapped to one PSFCH resource, and a part of the PSCCH/PSSCH resources are mapped to a plurality of PSFCH resources, that is, different PSCCH-PSFCH mapping criterions are used for different sub-channels in the same resource pool. The TX UE selects a PSCCH/PSSCH resource according to a predefined UE autonomous resource selection algorithm. If the selected PSCCH/PSSCH resource is mapped to one PSFCH resource, the first HARQ feedback mode is used, and if the selected PSCCH/PSSCH resource is mapped to a plurality of PSFCH resources, the second HARQ feedback mode is used.

When the TX UE is dynamically configured with the HARQ feedback mode for the groupcast transmission by the base station in the transmission mode 1, or, the TX UE autonomously selects the HARQ feedback mode for the groupcast transmission in the transmission mode 2, the TX UE may explicitly or implicitly notify the HARQ feedback mode used for the groupcast transmission to the RX UE through the SCI when transmitting the groupcast PSCCH/PSSCH.

As an example, the system specifies that the two HARQ feedback modes respectively use different SCI formats, the HARQ feedback mode for the groupcast transmission may be implicitly indicated by different SCI formats, and the RX UE should perform blind decoding on the two SCI formats. When the detected SCI format corresponds to the first HARQ feedback mode, only the NACK is fed back, and when the detected SCI format corresponds to the second HARQ feedback mode, the ACK/NACK is fed back.

As an example, the system specify that the two HARQ feedback modes use the same SCI format, and the HARQ feedback mode for the groupcast transmission may be explicitly indicated by a 1-bit specific signaling included in the SCI. When it is indicated that the first HARQ feedback mode is used, only the NACK is fed back, and when it is indicated that the second HARQ feedback mode is used, the ACK/NACK is fed back.

As an example, the system specify that the two HARQ feedback modes use the same SCI format, and the HARQ feedback mode for the groupcast transmission may be implicitly indicated by the indication information of the PSFCH resources included in the SCI, and the indication values of the PSFCH resources in the two HARQ feedback modes share the same indication field. When the indication value of the PSFCH resource implicitly indicates the first HARQ feedback mode, only the NACK is fed back, and when the indication value of the PSFCH resource implicitly indicates the second HARQ feedback mode, the ACK/NACK is fed back.

In step S302, a PSCCH/PSSCH is transmitted to a second UE.

As an example, the PSCCH transmitted to the second UE includes indication information of the HARQ feedback mode.

In step S303, a PSFCH transmitted by the second UE through performing HARQ feedback according to the decoding result of the PSCCH/PSSCH is received.

As an example, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, the one of the plurality of PSFCH resources is determined by one or more of the following parameters: a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

As an example, in the second HARQ feedback mode, the second UEs in a group to which UEs in the groupcast transmission belong use one of the plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to an UE index number and one or more of the following parameters: a pre-configured PSFCH resource offset, a PSFCH initial resource indicated in the PSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

As an example, when the PSCCH/PSSCH transmitted by the first UE to the second UE occupies a plurality of sub-channels, in the first HARQ feedback mode, all the second UEs in the group to which UEs in the groupcast transmission belong share one of all PSFCH resources corresponding to a plurality of PSCCH resources to transmit the PSFCH.

As an example, when the PSCCH/PSSCH transmitted by the first UE to the second UE occupies a plurality of sub-channels, in the second HARQ feedback mode, the second UEs in the group to which UEs in the groupcast transmission belong use one of all PSFCH resources corresponding to a plurality of PSCCH resources to transmit the PSFCH, respectively.

Figure 6:
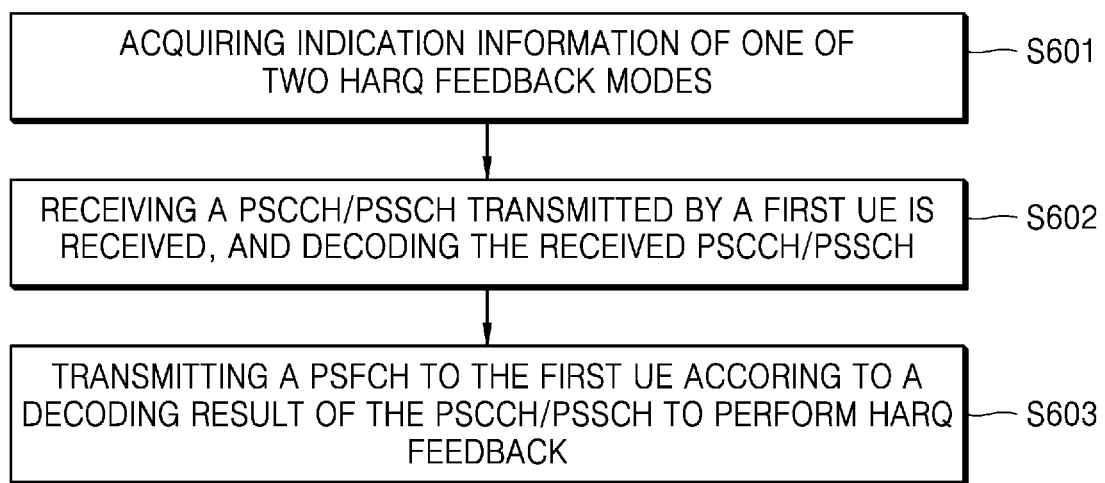
FIG. 6 illustrates a flowchart of an HARQ feedback method, according to an embodiment of the disclosure.

FIG. 6 illustrates a flowchart of a HARQ feedback method, performed by a second UE, according to an embodiment of the disclosure.

Figure 7:
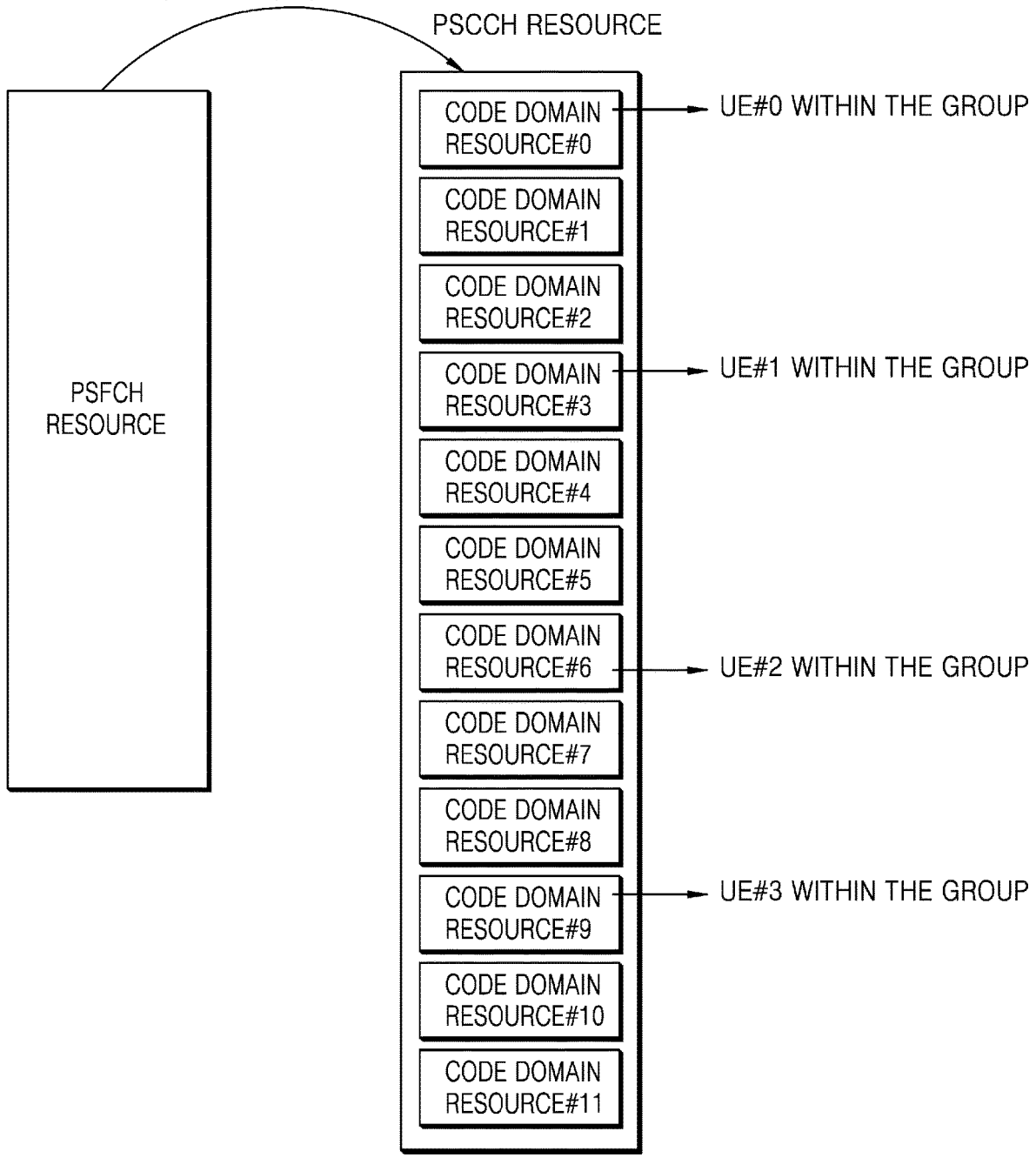
FIG. 7 illustrates a schematic diagram of determining PSFCH resource according to a UE index number, according to an embodiment of the disclosure.

FIG. 7 illustrates a schematic diagram of determining PSFCH resource according to a UE index number, according to an embodiment of the disclosure.

The HARQ feedback method in FIG. 6 may be a groupcast HARQ feedback method for the 5G NR V2X system, which is applicable to a groupcast transmission of a sidelink communication system.

Referring to FIG. 6, in step S601, indication information of one of two HARQ feedback modes is acquired.

The groupcast may support two HARQ feedback modes, a first HARQ feedback mode is a mode in which the second UE only feeds back the NACK, and a second HARQ feedback mode is a mode in which the second UE feeds back the ACK/NACK. The first HARQ feedback mode and the second HARQ feedback mode have been described above in the description regarding FIG. 3, and details are not described herein again.

As an example, when acquiring indication information of one of the two HARQ feedback modes, an HARQ feedback mode indicated by a UE-specific RRC signaling from a serving base station of the second UE may be acquired, or, an HARQ feedback mode indicated by sidelink pre-configuration parameters may be acquired, or, the HARQ feedback mode may be determined by the PSSCH.

As an example, when determining the HARQ feedback mode by the PSSCH, the HARQ feedback mode may be determined by SCI format carried by the PSSCH, and/or, the HARQ feedback mode may be determined by specific indication information of the HARQ feedback mode included in the PSSCH, and/or, the HARQ feedback mode may be determined by specific indication information of PSFCH resources included in the PSSCH.

In step S602, a PSCCH/PSSCH transmitted by a first UE is received, and the received PSCCH/PSSCH is decoded.

In step S603, a PSFCH is transmitted to the first UE according to the decoding result of the PSCCH/PSSCH to perform HARQ feedback.

As an example, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, the one of the plurality of PSFCH resources is determined by one or more of the following parameters: a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

As an example, in the second HARQ feedback mode, the second UEs in a group to which UEs in the groupcast transmission belong use one of the plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to an UE index number and one or more of the following parameters: a pre-configured PSFCH resource offset, a PSFCH initial resource indicated in the PSSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

As an example, when the PSCCH/PSSCH transmitted by the first UE to the second UE occupies a plurality of sub-channels, in the first HARQ feedback mode, all the second UEs in the group to which UEs in the groupcast transmission belong share one of all PSFCH resources corresponding to a plurality of PSCCH resources to transmit the PSFCH.

As an example, when the PSCCH/PSSCH transmitted by the first UE to the second UE occupies a plurality of sub-channels, in the second HARQ feedback mode, the second UEs in the group to which UEs in the groupcast transmission belong use one of all PSFCH resources corresponding to a plurality of PSCCH resources to transmit the PSFCH, respectively.

As an example, when transmitting PSFCH to the first UE, when the number of PSFCHs to be transmitted exceeds the number allowed by the system, or when the transmitting of the PSFCH collides with the receiving of the PSFCH, a redundant PSFCH is discarded in one slot based on at least one of a priority of a data packet indicated in the PSCCH corresponding to the PSFCH, a transmission type of the PSCCH/PSSCH corresponding to the PSFCH, HARQ feedback information carried by the PSFCH, Reference Signal Received Power (RSRP) measured on the PSCCH/PSSCH corresponding to the PSFCH, and an HARQ feedback mode used by the PSFCH.

As an example, when both of the PSFCH resource and the PSCCH/PSSCH resource are FDM, the HARQ feedback method may further includes: when the transmitting of the PSCCH/PSSCH collides with the transmitting of the PSFCH, or when the transmitting of the PSCCH/PSSCH collides with the receiving of the PSFCH, or when the receiving of the PSCCH/PSSCH on the reserved resource collides with the transmitting of the PSFCH, the PSCCH/PSSCH or the PSFCH is discarded in one slot based on at least one of a priority of a data packet indicated within the PSCCH corresponding to the PSFCH, a PSCCH/PSSCH resource allocation manner, whether the resource of the transmitted PSCCH/PSSCH is reserved in advance by SCI, a transmission type of the PSCCH/PSSCH corresponding to the PSFCH, HARQ feedback information carried by the PSFCH, and an HARQ feedback mode used by the PSFCH.

In the sidelink communication system, in order to simplify the design of system, the PSCCH resources and the PSFCH resources in a resource pool may have a predefined or pre-configured mapping relationship. Here, the mapping relationship may be one-to-one, that is, one PSCCH resource corresponds to one PSFCH, and the mapping relationship also may be one-to-many, that is, one PSCCH resource corresponds to a plurality of PSFCH resources. When the RX UE detects that there is data transmission on one PSCCH/PSSCH resource, the HARQ-ACK should be fed back on the corresponding PSFCH resource, that is, the PSFCH resource is not determined by the RX UE, but is determined by the PSCCH/PSSCH resource used by the TX UE.

As an example, the groupcast transmissions using the above two HARQ feedback modes share the same resource pool. In the shared resource pool, all PSCCH resources may have the same mapping relationship with the PSFCH resources, that is, there is only one mapping relationship between the PSCCH resource and the PSFCH resource, in other words, the above two HARQ feedback modes use the same mapping relationship between the PSCCH resources and the PSFCH resources, and the PSCCH resources have a one-to-many mapping relationship with the PSFCH resources. For the first HARQ feedback mode, all the RX UEs in the group share one of the corresponding a plurality of PSFCH resources, and for the second HARQ feedback mode, each RX UE in the group uses one of the corresponding a plurality of PSFCH resources, respectively.

As an example, if the mapping relationship between the PSCCH resources and the PSFCH resources is one-to-many, when the groupcast transmission uses the first HARQ feedback mode, all RX UEs in the group may share the same PSFCH resource, and the TX UE explicitly indicates the PSFCH resource shared by the RX UEs through the SCI. For example, one PSCCH resource corresponds to $N_{PSFCH}$ PSFCH resources in a predefined or pre-configured manner, and the SCI includes a specific PSFCH resource indication field with a size of n bits ($n=\lceil \log_2^{N_{PSFCH}} \rceil$), for indicating the PSFCH shared by the RX UEs. In the transmission mode 1, the PSFCH resource shared by the RX UEs may be indicated in the DCI that indicates the sidelink resource scheduling information by the base station, and the TX UE indicates the PSFCH resource shared by the RX UEs through the SCI. In the transmission mode 2, the PSFCH resource shared by the RX UEs may be determined by the TX UE. How to select the PSFCH resource shared by the RX UEs from $N_{PSFCH}$ PSFCH resources depends on the implementation of the TX UE, or the TX UE randomly selects one of the $N_{PSFCH}$ PSFCH resources. As the PSFCH resource shared by the RX UEs, the method of randomly selecting the PSFCH resource by the TX UE can reduce the collision probability of the PSFCH resources and improve the reliability of the PSFCH transmission. For example, two groupcast transmissions may happen to use the same PSCCH/PSSCH resource, but the corresponding HARQ-ACK feedback may use different PSFCH resources, that is, resource collision occurs in the PSCCH/PSSCH, but there may be no collision occurring in corresponding PSFCHs. This method of allocating PSFCH resources is also applicable to HARQ feedback for unicast transmission.

As an example, if the mapping relationship between the PSCCH resources and the PSFCH resources is one-to-many, when the groupcast transmission uses the first HARQ feedback mode, all RX UEs in the group may share the plurality of PSFCH resources corresponding to the PSCCH resource, and the RX UE randomly selects one of the plurality of PSFCH resources corresponding to the PSCCH resource as an actually used PSFCH resource when feeding back the NACK. Since the PSFCH resources actually used by the RX UEs in the group may be different, the TX UE should perform the receiving of the PSFCH on each of the plurality of PSFCH resources corresponding to the PSCCH resource.

This method can reduce the number of the NACK feedbacks that may be superimposed on one PSFCH resource, thereby reducing the destructive effect of the channel accumulation effect.

As an example, if the mapping relationship between the PSCCH resources and the PSFCH resources is one-to-many, when the groupcast transmission uses the first HARQ feedback mode, all RX UEs in the group may share the same PSFCH resource, and the system can specify that the RX UEs determines the shared PSFCH resource through the predefined rule.

For example, the RX UEs may determine the shared resource according to the formula $i_{PSFCH}$=Aspec % $N_{PSFCH}$. Here, the parameter Aspect may be any one or more of a destination group ID carried in the SCI, a transmission source ID carried in the SCI (i.e., the ID of the TX UE), a cyclic phase used by the DMRS of the PSCCH, an initialization seed of the pseudo-random sequence generator used by the DMRS of the PSCCH, a decimal value of the CRC of the PSCCH, and a scrambling code sequence used by the CRC of the PSCCH.

In the sidelink communication system, the minimum resource granularity of data transmission is a sub-channel, and each sub-channel includes one PSCCH resource and one PSSCH resource. The PSCCH resource is used to transmit the SCI, the SCI is used to indicate the physical transmission parameters and other control information of the PSSCH, and the PSSCH resource is used to transmit data. When the system supports HARQ-ACK feedback, the PSCCH resource of each sub-channel will have a corresponding PSFCH resource. When transmitting the data, the TX UE may occupy one or more consecutive sub-channels to transmit the PSSCH according to the size of the data packet, and indicate the number of occupied sub-channels in the SCI.

As an example, when the PSSCH transmitted by the TX UE occupies a plurality of sub-channels, the RX UEs in the group may determine the corresponding PSFCH resource within the set of the plurality of PSFCH resources corresponding to the PSCCH resources of the plurality of sub-channels, that is, the $N_{PSFCH}$ is the size of the total set of PSFCH resources corresponding to the plurality of sub-channels PSCCH resources.

As an example, if the mapping relationship between the PSCCH resources and the PSFCH resources is one-to-many, when the groupcast transmission uses the second HARQ feedback mode (ACK/NACK feedback), each RX UE in the group to which the UEs in the groupcast transmission belong may use different PSFCH resources. In order to allocate corresponding PSFCH resources to each RX UE, each UE in the group may be configured with a unique UE index number within the group when the group is established, and the RX UE may determine the corresponding PSFCH resource according to the configured UE index number.

For example, the system may indicate that one PSCCH resource corresponds to $N_{PSFCH}$ PSFCH resources in a predefined or pre-configured manner. For the groupcast transmission which uses the second HARQ feedback mode, the number of RX UEs in the group should be smaller than the number $N_{PSFCH}$ of PSFCH resources, to ensure that each RX UE has its own PSFCH resource. For example, the RX UE may select the $i_{PSFCH}$-th resource among the $N_{PSFCH}$ resources for feeding back HARQ-ACK, here, the $i_{PSFCH} \in$ (0, $N_{PSFCH}$). As an example, the $i_{PSFCH}$=UEIndexInGroup % $N_{PSFCH}$ or the $i_{PSFCH}$=UEIndexInGroup, here, the UEIndexInGroup is the UE index number within the group in which the RX UE is configured by the upper layer or the application layer. As an example, the $i_{PSFCH}$=(UEIndexInGroup*Offset) % $N_{PSFCH}$ here, the UEIndexInGroup is the UE index number within the group in which the RX UE is configured by the upper layer or the application layer, the Offset is an offset value of the PSFCH resource, which may be pre-configured by the upper layer, or indicated in the SCI, or calculated by a predefined rule. For example, the Offset=$\lfloor N_{PSFCH}/N_{RX\_UE} \rfloor$, the $N_{RX\_UE}$ is the number of RX UEs in the group configured by the upper layer or the application layer. When the number $N_{RX\_UE}$ of RX UEs in the group is less than the number $N_{PSFCH}$ of PSFCH resources, the Offset may be used to separate the PSFCH resources used by each RX UE at equal intervals. Assuming that the plurality of PSFCH resources corresponding to the PSCCH resources are different code domain resources superimposed on the same time-frequency resource, the equal interval separation of the code domain resources can maximize the spatial distance between a plurality of PSFCH code domains, thereby improving the detection performance of the plurality of PSFCHs that are quasi-orthogonal in the code domain.

Referring to FIG. 7, the PSCCH resource has a predefined or pre-configured mapping relationship with the PSFCH resource of the corresponding HARQ-ACK feedback. For example, one PSCCH resource corresponds to 12 PSFCH code domain resources multiplexed on the same time-frequency resource, the number of RX UEs in the group is 4, then the Offset=$\lfloor N_{PSFCH}/N_{RX\_UE} \rfloor$=$\lfloor 12/4 \rfloor$=3, and the RX UE determines the corresponding PSFCH resource within the $N_{PSFCH}$ PSFCH resources according to the corresponding UE index number within the group and the Offset, that is, the $i_{PSFCH}$=(UEIndexInGroup*Offse) % $N_{PSFCH}$. Accordingly, a UE #0 within the group uses a PSFCH code domain resource #0, a UE #1 within the group uses a PSFCH code domain resource #3, a UE #2 within the group uses a PSFCH code domain resource #6, and a UE #3 within the group uses a PSFCH code domain resource #9, such equal interval separation of the code domain resources of PSFCH can improve the detection performance of PSFCH.

As an example, when the PSSCH transmitted by the TX UE occupies a plurality of sub-channels, the RX UEs in the group may determine the corresponding PSFCH resource within the set of the plurality of PSFCH resources corresponding to the PSCCH resources of the plurality of sub-channels. For example, as shown in FIG. 7, the PSCCH resources of one sub-channel correspond to 12 PSFCH code domain resources, and the PSCCH resources of different sub-channels correspond to PSFCHs on different time frequency resource blocks. Assuming that the TX UE transmits PSSCH on two consecutive sub-channels, the PSFCH resource set used by the RX UE is PSFCH resources on two time-frequency resource blocks, and the PSFCH resources on each time-frequency resource block include 12 code domain resources, that is, the $N_{PSFCH}$ is 24. Accordingly, the Offset=$\lfloor N_{PSFCH}/N_{RX\_UE} \rfloor$=$\lfloor 24/4 \rfloor$=6, and the RX UE determines the corresponding PSFCH resource within the total PSFCH resources set according to the corresponding UE index number within the group and the Offset. For example, if the $i_{PSFCH}$=(UEIndexInGroup*Offse) % $N_{PSFCH}$, then the UE #0 within the group uses a PSFCH code domain resource #0 corresponding to the PSCCH resource of the first sub-channel, the UE #1 within the group uses a PSFCH code domain resource #6 corresponding to the PSCCH resource of the first sub-channel, and the UE #2 within the group uses a PSFCH code domain resource #0 corresponding to the PSCCH resource of the second sub-channel, the UE #3 within the group uses a PSFCH code domain resource #6 corresponding to the PSCCH resource of the second subchannel.

As an example, the $i_{PSFCH}$=(UEIndexInGroup*Offset+Aspec)% $N_{PSFCH}$ or, the $i_{PSFCH}$=(UEIndexInGroup+Aspec) % $N_{PSFCH}$. Here, the UEIndexInGroup and the Offset refer to the above described, the parameter Aspect is PSFCH resources used for randomization, so different PSCCH/PSSCH groupcast transmissions on the same resource may use different PSFCH resources to reduce the PSFCH interference in the same resource pool. For example, the Aspect may be any one or more of a destination group ID carried in the SCI, a transmission source ID carried in the SCI (i.e., the ID of the TX UE), a cyclic phase used by the DMRS of the PSCCH, an initialization seed of the pseudo-random sequence generator used by the DMRS of the PSCCH, a decimal value of the CRC of the PSCCH, and a scrambling code sequence used by the CRC of the PSCCH.

As an example, the SCI includes a specific PSFCH resource indication field, and the PSFCH resource indicated in the SCI is the PSFCH resource of the first RX UE (i.e., UE #0) in the group, and the PSFCH resources of other RX UEs regard the PSFCH indicated in the SCI as a reference resource and are calculated according to a predefined method. For example, a PSFCH reference resource is used as a starting resource, and all the RX UEs in the group are allocated PSFCH resources at a certain interval, that is, the $i_{PSFCH}^{UE_j}$=(j*Offset+$i_{PSFCH}^{UE_0}$) % $N_{PSFCH}$. Alternatively, the PSFCH reference resource is used as a starting resource, and PSFCH resources are continuously allocated for all RX UEs in the group, that is, the $i_{PSFCH}^{UE_j}$=(j+$i_{PSFCH}^{UE_0}$) % $N_{PSFCH}$. Here, the $i_{PSFCH}^{UE_0}$ is the PSFCH resource of UE #0, that is, the PSFCH resource indicated in the SCI, and the $i_{PSFCH}^{UE_j}$ is the PSFCH resource of UE #j.

As an example, the groupcast transmission using the above two HARQ feedback modes may share the same resource pool. In the shared resource pool, there are two mapping relationships between the PSCCH resources and the PSFCH resources, and part of the PSCCH resources and the PSFCH resources have one-to-one mapping relationships, part of the PSCCH/PSSCH resources and its corresponding PSFCH resources are used for groupcast transmission using the first HARQ feedback mode, and all RX UEs in the group share the same PSFCH resource; other part of the PSCCH resources and the PSFCH resources have a one-to-many mapping relationship, the other part of the PSCCH/PSSCH resources and its corresponding PSFCH resources are used for groupcast transmission using the second HARQ feedback mode, and each RX UE in the group uses a different PSFCH resource. The system indicates, in a predefined or pre-configured manner, which PSCCH resource in the resource pool has a one-to-one mapping relationship with the PSFCH resources, and which PSCCH resource has a one-to-many mapping relationship with the PSFCH resources.

As an example, the groupcast transmission using the above two HARQ feedback modes may be based on different resource pools. For example, in a resource pool corresponding to the first HARQ feedback mode, the PSCCH resources and the PSFCH resources may have a one-to-one mapping relationship, and all RX UEs in the groupcast transmission share the same PSFCH resource; in a resource pool corresponding to the second HARQ feedback mode, the PSCCH resources and the PSFCH resources may have a one-to-many mapping relationship, and different RX UEs in the groupcast transmission use different PSFCH resources.

The HARQ feedback method according to the various embodiments of the disclosure has been described above with reference to FIG. 1 to FIG. 7. Hereinafter, a UE and modules thereof according to the various embodiments of the disclosure will be described with reference to FIG. 8 and FIG. 11.

Figure 8:
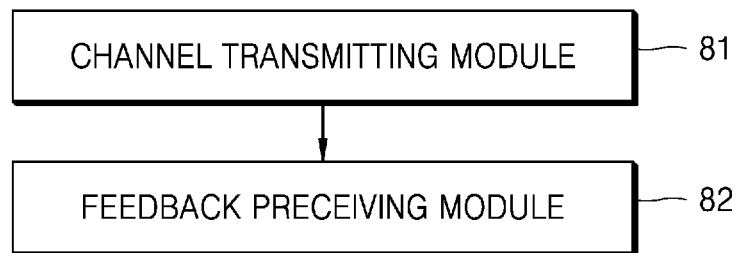
FIG. 8 illustrates a block diagram of a UE according to an embodiment of the disclosure.

FIG. 8 illustrates a block diagram of a UE according to an embodiment of the disclosure.

Referring to FIG. 8, the UE includes a channel transmitting module 81 and a feedback receiving module 82.

The channel transmitting module 81 is configured to transmit a PSCCH/PSSCH to a second UE.

The feedback receiving module 82 is configured to receive a Physical Sidelink Feedback Channel (PSFCH) transmitted by the second UE through performing the HARQ feedback according to the decoding result of the PSCCH/PSSCH.

Figure 9:
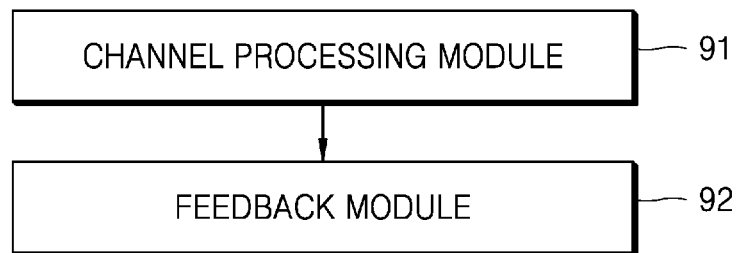
FIG. 9 illustrates a block diagram of a UE according to an embodiment of the disclosure.

FIG. 9 illustrates a block diagram of a UE according to an embodiment of the disclosure.

Referring to FIG. 9, UE includes a channel processing module 91 and a feedback module 92.

The channel processing module 91 is configured to receive a PSCCH/PSSCH transmitted by a first UE, and to decode the received PSCCH/PSSCH.

The feedback module 92 is configured to transmit a PSFCH to the first UE according to the decoding result of the PSCCH/PSSCH to perform HARQ feedback.

Figure 10:
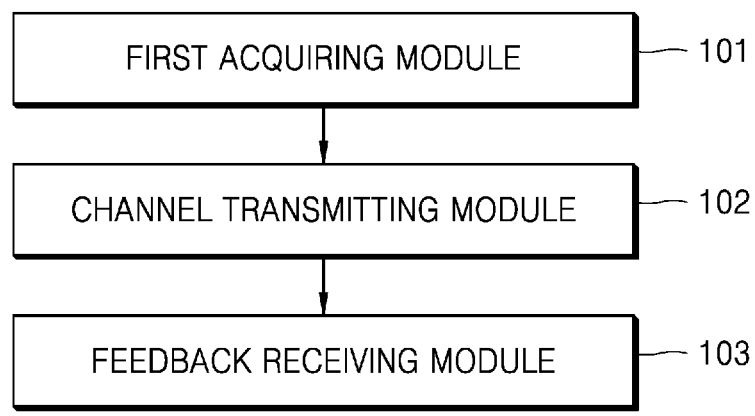
FIG. 10 illustrates a block diagram of a UE according to an embodiment of the disclosure.

FIG. 10 illustrates a block diagram of a UE according to an embodiment of the disclosure.

Referring to FIG. 10, UE includes a first acquiring module 101, a channel transmitting module 102 and a feedback receiving module 103.

The first acquiring module 101 is configured to acquire indication information of one of two HARQ feedback modes, wherein a first HARQ feedback mode is a mode in which the second UE only feeds back the NACK, and a second HARQ feedback mode is a mode in which the second UE feeds back the ACK/NACK.

The channel transmitting module 102 is configured to transmit a PSCCH/PSSCH to a second UE; and The feedback receiving module 103 is configured to receive a Physical Sidelink Feedback Channel (PSFCH) transmitted by the second UE through performing the HARQ feedback according to the decoding result of the PSCCH/PSSCH.

As an example, the first acquiring module 101 may be configured to acquire an HARQ feedback mode indicated by a UE-specific RRC signaling from a serving base station of the first UE, or, to acquire the HARQ feedback mode indicated by sidelink pre-configuration parameters, or, to determine the HARQ feedback mode according to predefined rules.

As an example, the first acquiring module 101 may be configured to determine the HARQ feedback mode according to a type of a group to which UEs in the groupcast transmission belong, wherein the first HARQ feedback mode is used when the type of the group to which UEs in the groupcast transmission belong is connection-less, and/or, to determine the HARQ feedback mode according to the number of members in the group to which UEs in the groupcast transmission belong, wherein the first HARQ feedback mode is used when the number of members in a group to which UEs in the groupcast transmission belong is greater than a number of PSFCH resources corresponding to one PSCCH resource, and/or, to determine the HARQ feedback mode according to QoS of the data service, wherein the second HARQ feedback mode is used for the data service whose QoS requirement is within a preset range.

As an example, the PSCCH transmitted to the second UE includes indication information of a HARQ feedback mode.

As an example, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, the one of the plurality of PSFCH resources is determined by one or more of a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

As an example, in the second HARQ feedback mode, the second UEs in a group to which UEs in a groupcast transmission belong use one of a plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to a UE index number and one or more of a pre-configured PSFCH resource offset, a PSFCH initial resource indicated in the PSSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

As an example, when the PSCCH/PSSCH transmitted by the first UE to the second UE occupies a plurality of sub-channels, in the first HARQ feedback mode, all the second UEs in a group to which UEs in a groupcast transmission belong share one of all PSFCH resources corresponding to the plurality of PSCCH resources to transmit the PSFCH.

As an example, when the PSCCH/PSSCH transmitted by the first UE to the second UE occupies a plurality of sub-channels, in the second HARQ feedback mode, the second UEs in a group to which UEs in a groupcast transmission belong use one of all PSFCH resources corresponding to the plurality of PSCCH resources to transmit the PSFCH, respectively.

Figure 11:
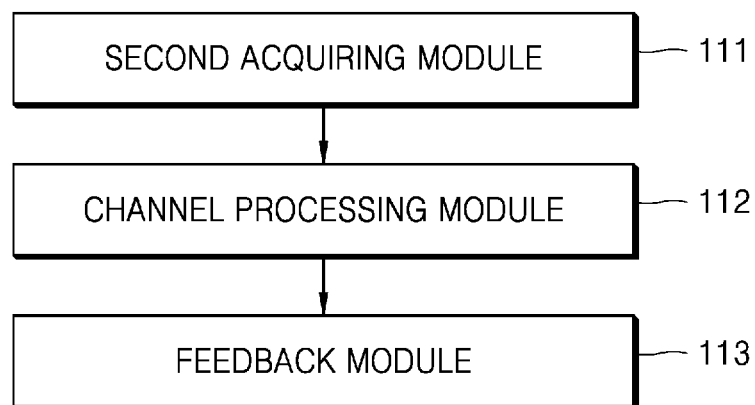
FIG. 11 illustrates a block diagram of a UE according to an embodiment of the disclosure.

FIG. 11 illustrates a block diagram of a UE according to an embodiment of the disclosure.

Referring to FIG. 11, UE includes a second acquiring module 111, a channel processing module 112 and a feedback module 113.

The second acquiring module 111 is configured to acquire indication information of one of two HARQ feedback modes, wherein a first HARQ feedback mode is a mode in which the second UE only feeds back the NACK, and a second HARQ feedback mode is a mode in which the second UE feeds back the ACK/NACK.

The channel processing module 112 is configured to receive a PSCCH/PSSCH transmitted by a first UE, and to decode the received PSCCH/PSSCH.

The feedback module 113 is configured to transmit a PSFCH to the first UE according to the decoding result of the PSCCH/PSSCH to perform HARQ feedback.

As an example, the second acquiring module 111 may be configured to acquire an HARQ feedback mode indicated by a UE-specific RRC signaling from a serving base station of the second UE, or, to acquire a HARQ feedback mode indicated by sidelink pre-configuration parameters, or, to determine the HARQ feedback mode by the PSSCH.

As an example, the second acquiring module 111 may be configured to determine the HARQ feedback mode by a SCI format carried by the PSSCH, and/or, to determine the HARQ feedback mode by specific indication information of the HARQ feedback mode included in the PSSCH, and/or, to determine the HARQ feedback mode by specific indication information of PSFCH resources included in the PSSCH.

As an example, in the first HARQ feedback mode, all the second UEs in the group to which UEs in the groupcast transmission belong share one of a plurality of PSFCH resources corresponding to the PSCCH resources to transmit the PSFCH, wherein the one of the plurality of PSFCH resources is indicated by a specific signaling included in the PSCCH, or, one of the plurality of PSFCH resources is determined by one or more of a destination group ID indicated within the PSCCH, a transmission source ID indicated within the PSCCH, a cyclic phase of a Demodulation Reference Signal (DMRS) of the PSCCH, an initialization seed of a pseudo-random sequence generator of the DMRS of the PSCCH, a decimal value of a Cyclic Redundancy Code (CRC) of the PSCCH, and a scrambling code sequence of the CRC of the PSCCH.

As an example, in the second HARQ feedback mode, the second UEs in a group to which UEs in the groupcast transmission belong use one of the plurality of PSFCH resources corresponding to the PSCCH resources to transmit the PSFCH, respectively, wherein the one of the plurality of PSFCH resources is determined at least based on a unique UE index number within the group, or, the one of the plurality of PSFCH resources is determined according to an UE index number and one or more of a pre-configured PSFCH resource offset, a PSFCH initial resource indicated in the PSSCCH, a destination group ID indicated in the PSCCH, a transmission source ID indicated in the PSCCH, a cyclic phase of the DMRS of the PSCCH, an initialization seed of a pseudo-random sequence generator of the DMRS of the PSCCH, a decimal value of the CRC of the PSCCH, and a scrambling sequence of the CRC of the PSCCH.

As an example, when the PSCCH/PSSCH transmitted by the first UE to the second UE occupies a plurality of sub-channels, in the first HARQ feedback mode, all the second UEs in a group to which UEs in the groupcast transmission belong share one of all PSFCH resources corresponding to a plurality of PSCCH resources to transmit the PSFCH.

As an example, when the PSCCH/PSSCH transmitted by the first UE to the second UE occupies a plurality of sub-channels, in the second HARQ feedback mode, the second UEs in the group to which UEs in the groupcast transmission belong use one of all PSFCH resources corresponding to a plurality of PSCCH resources to transmit the PSFCH, respectively.

As an example, the feedback module 113 may be configured to discard, when the number of PSFCHs to be transmitted exceeds the number allowed by a system, or when the transmitting of the PSFCH collides with the receiving of the PSFCH, a redundant PSFCH in one slot based on at least one of a priority of a data packet indicated in the PSCCH corresponding to the PSFCH, a transmission type of the PSCCH/PSSCH corresponding to the PSFCH, HARQ feedback information carried by the PSFCH, Reference Signal Received Power (RSRP) measured on the PSCCH/PSSCH corresponding to the PSFCH, and an HARQ feedback mode used by the PSFCH.

As an example, when both of the PSFCH resource and the PSCCH/PSSCH resource are FDM, the feedback module 113 may be configured to discard, when the transmitting of the PSCCH/PSSCH collides with the transmitting of the PSFCH, or when the transmitting of the PSCCH/PSSCH collides with the receiving of the PSFCH, or when the receiving of the PSCCH/PSSCH on the reserved resource collides with the transmitting of the PSFCH, the PSCCH/PSSCH or the PSFCH in one slot based on at least one of a priority of a data packet indicated within the PSCCH corresponding to the PSFCH, a PSCCH/PSSCH resource allocation manner, whether or not the resource of the transmitted PSCCH/PSSCH is reserved in advance by SCI, a transmission type of the PSCCH/PSSCH corresponding to the PSFCH, HARQ feedback information carried by the PSFCH, and an HARQ feedback mode used by the PSFCH.

In addition, according to the various embodiments of the disclosure, a computer readable storage medium having a computer program stored thereon is provided, wherein when the computer program is executed, steps of the HARQ feedback method according to the disclosure are implemented.

As an example, when the computer program is being executed, the follow steps may be implemented: transmitting a Physical Sidelink Control Channel (PSCCH)/Physical Sidelink Shared Channel (PSSCH) to a second UE, and receiving a Physical Sidelink Feedback Channel (PSFCH) transmitted by the second UE performing the HARQ feedback according to a decoding result of the PSCCH/PSSCH.

As another example, when the computer program is being executed, the follow steps may be implemented: acquiring indication information of one of two HARQ feedback modes, transmitting a Physical Sidelink Control Channel (PSCCH)/Physical Sidelink Shared Channel (PSSCH) to a second UE, and receiving a Physical Sidelink Feedback Channel (PSFCH) transmitted by the second UE performing the HARQ feedback according to a decoding result of the PSCCH/PSSCH.

As another example, when the computer program is being executed, the follow steps may be implemented: receiving a PSCCH/PSSCH transmitted by a first UE, and decoding the received PSCCH/PSSCH, and transmitting a PSFCH to the first UE according to a decoding result of the PSCCH/PSSCH to perform HARQ feedback.

As another example, when the computer program is being executed, the follow steps may be implemented: acquiring indication information of one of two HARQ feedback modes, receiving a PSCCH/PSSCH transmitted by a first UE, and decoding the received PSCCH/PSSCH, and transmitting a PSFCH to the first UE according to a decoding result of the PSCCH/PSSCH to perform HARQ feedback.

The UE according to the various embodiments of the disclosure has been described above with reference to FIG. 8 to FIG. 11. Hereinafter, a UE according to the various embodiments of the disclosure will be described with reference to FIG. 12.

Figure 12:
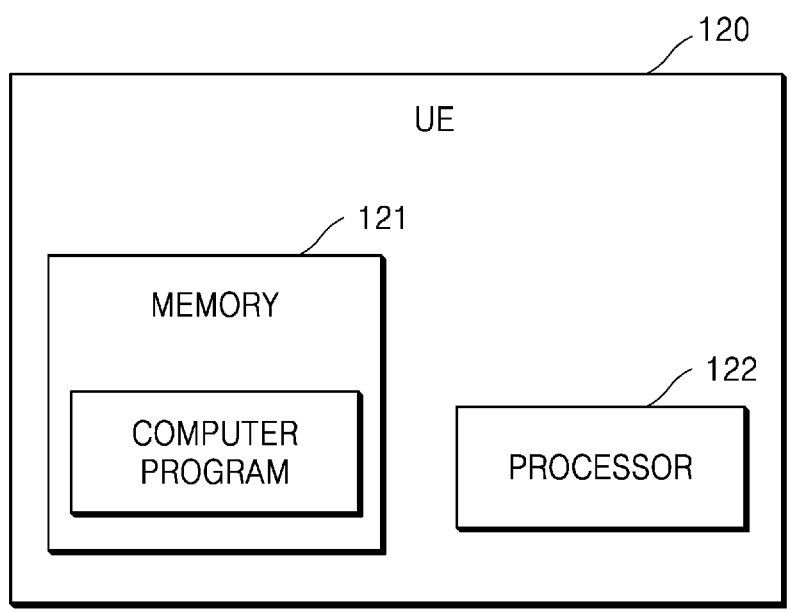
FIG. 12 illustrates a schematic diagram of a UE according to an embodiment of the disclosure.

FIG. 12 illustrates a schematic diagram of a UE, according to an embodiment of the disclosure.

Referring to FIG. 12, a UE 120 according to an embodiment of the disclosure includes a memory 121, a processor 122, and a computer program which is stored on the memory and operable on the processor 122, wherein when the computer program is executed by a processor 122, an HARQ feedback method according to the various embodiments of the disclosure.

As an example, the processor 122 may be configured to transmitting a Physical Sidelink Control Channel (PSCCH)/Physical Sidelink Shared Channel (PSSCH) to a second UE, and receiving a Physical Sidelink Feedback Channel (PSFCH) transmitted by the second UE performing the HARQ feedback according to a decoding result of the PSCCH/PSSCH.

As another example, the processor 122 may be configured to: acquiring indication information of one of two HARQ feedback modes, transmitting a Physical Sidelink Control Channel (PSCCH)/Physical Sidelink Shared Channel (PSSCH) to a second UE, and receiving a Physical Sidelink Feedback Channel (PSFCH) transmitted by the second UE performing the HARQ feedback according to a decoding result of the PSCCH/PSSCH.

As another example, the processor 122 may be configured to: receiving a PSCCH/PSSCH transmitted by a first UE, and decoding the received PSCCH/PSSCH, and transmitting a PSFCH to the first UE according to the decoding result of the PSCCH/PSSCH to perform HARQ feedback.

As another example, the processor 122 may be configured to: acquiring indication information of one of two HARQ feedback modes, receiving a PSCCH/PSSCH transmitted by a first UE, and decoding the received PSCCH/PSSCH, and transmitting a PSFCH to the first UE according to the decoding result of the PSCCH/PSSCH to perform HARQ feedback.

The HARQ feedback method, and the UEs performing the HARQ feedback method according to the various embodiments of the disclosure have been described above with reference to FIGS. 1-11. However, it should be understood that the UEs performing the HARQ feedback method and modules therein shown in FIGS. 8-11 may be respectively configured to execute software, hardware, firmware, or any combination of them of a specific function. The UE as shown in FIG. 12 is not limited to including the components shown above, but some components may be added or deleted as needed, and the above components may also be combined.

Those skilled in the art will understand that the disclosure includes apparatus related to performing one or more of the operations described herein. These apparatus may be specially designed and manufactured for the required purposes, or may also include known apparatus in a general purpose computer. These apparatus have computer programs stored therein, and are selectively activated or reconfigured. Such computer programs may be stored in the readable medium of a apparatus (for example, a computer) or in any type of mediums suitable for storing electronic instructions and coupled to a bus, respectively, The computer readable mediums including but not limited to any types of disks (including floppy disks, hard disks, optical disks, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic card or light card. That is, a readable medium includes any medium that is stored or transmitted by an apparatus (for example, a computer) in a readable form.

Those skilled in the art will understand that each block of the block diagrams and/or block diagrams and/or flow diagrams and combinations of blocks in the block diagrams and/or block diagrams and/or flow diagrams can be implemented by computer program instructions. Those skilled in the art will understand that these computer program instructions can be implemented by a general purpose computer, a professional computer, or a processor of other programmable data processing methods, such that schemes specified in the block or various blocks of the disclosed structure and/or block diagrams and/or flow diagrams can be executed by a computer or the processor of other programmable data processing method.

Those skilled in the art will understand that the steps, measures, and schemes in the various operations, methods, and processes that have been discussed in the disclosure can be alternated, changed, combined, or deleted. Further, other steps, measures, and schemes in the various operations, methods, and processes that have been discussed in the disclosure can be alternated, modified, rearranged, decomposed, combined, or deleted. Further, the steps, measures, and solutions in the prior art having various operations, methods, and processes disclosed in the disclosure can also be alternated, modified, rearranged, decomposed, combined, or deleted.

The above is only a part of the embodiments of the disclosure, and it should be noted that those skilled in the art can also make several improvements and modification without departing from the principles of the disclosure. These improvements and modification should be considered as within the scope of protection of the disclosure.

While the disclosure has been shown and described with reference to certain various embodiments thereof, it should be understood by those skilled in the art that various changes in form and details may be made therein without departing from the spirit and scope of the disclosure which are defined by the appended claims and their equivalents.

What is claimed is:

1. A method performed by a first user equipment (UE) in a wireless communication system, the method comprising:
receiving sidelink control information (SCI);
identifying a physical sidelink feedback channel (PSFCH) resource for transmitting hybrid automatic repeat request (HARQ) feedback information based on the SCI; and
transmitting the HARQ feedback information based on the identified PSFCH resource,
wherein the identified PSFCH resource corresponds to (UEindexGroup+Aspect) mod $N_{PFSCH}$,
wherein the UEindexGroup indicates zero or an identity of the first UE,
wherein the Aspect indicates a physical layer source identifier, and
wherein the $N_{PFSCH}$ indicates a number of PSFCH resources available for transmitting the HARQ feedback information.

2. The method of claim 1, further comprising:
identifying a HARQ feedback type based on the SCI,
wherein the UEindexGroup is determined based on the HARQ feedback type.

3. The method of claim 1, further comprising:
identifying priority information for a plurality of PSFCHs through a physical sidelink control channel (PSCCH); and
in case that a transmission of a first PSFCH would overlaps in time with a reception of a second PSFCH, performing the transmission of the first PSFCH or the reception of the second PSFCH based on the priority information.

4. The method of claim 1, further comprising:
receiving priority information for a plurality of PSFCHs through a physical sidelink control channel (PSCCH); and
identifying one or more PSFCHs among the plurality of PSFCHs based on the received priority information,
wherein the identified one or more PSFCHs are transmitted.

5. A method performed by a second user equipment (UE), in a wireless communication system, the method comprising:
transmitting sidelink control information (SCI) to a first UE; and
receiving hybrid automatic repeat request (HARQ) feedback information through a physical sidelink feedback channel (PSFCH),
wherein a PSFCH resource for the HARQ feedback information corresponds to (UEindexGroup+Aspect) mod $N_{PFSCH}$,
wherein the UEindexGroup indicates zero or an identity of the first UE,
wherein the Aspect indicates a physical layer source identifier, and
wherein the $N_{PFSCH}$ indicates a number of PSFCH resources available for transmitting the HARQ feedback information.

6. The method of claim 5,
wherein the UEindexGroup is determined based on a HARQ feedback type, and
wherein the HARQ feedback type is identified based on the SCI.

7. The method of claim 5, further comprising:
in case that a transmission of a first PSFCH would overlap in time with a reception of a second PSFCH, receiving the first PSFCH or transmitting of the second PSFCH based on priority information for a plurality of PSFCHs through a physical sidelink control channel (PSCCH),
wherein the priority information is identified at the first UE.

8. The method of claim 5, further comprising:
transmitting priority information for a plurality of PSFCHs through a physical sidelink control channel (PSCCH), to the first UE,
wherein one or more PSFCHs among the plurality of PSFCHs for are transmitted based on the transmitted priority information.

9. A first user equipment (UE) in a wireless communication system, the first UE comprising:
a transceiver; and
a processor coupled to the transceiver, the processor configured to:
control the transceiver to receive sidelink control information (SCI),
identify a physical sidelink channel (PSFCH) resource for transmitting hybrid automatic repeat request (HARQ) feedback information based on the SCI,
control the transceiver to transmit the HARQ feedback information based on the identified PSFCH resource,
wherein the identified PSFCH resource corresponds to (UEindexGroup+Aspect) mod $N_{PFSCH}$,
wherein the UEindexGroup indicates zero or an identity of the first UE,
wherein the Aspect indicates a physical layer source identifier, and
wherein the $N_{PFSCH}$ indicates a number of PSFCH resources available for transmitting the HARQ feedback information.

10. The first UE of claim 9, wherein the processor is further configured to:
identify a HARQ feedback type based on the SCI,
wherein the UEindexGroup is determined based on the HARQ feedback type.

11. The first UE of claim 9, wherein the processor is further configured to:
identify priority information for a plurality of PSFCHs through the a physical sidelink control channel (PSCCH), and
in case that a transmission of a first PSFCH would overlaps in time with a reception of a second PSFCH, perform the transmission of the first PSFCH or the reception of the second PSFCH based on the identified priority information.

12. The first UE of claim 9,
wherein the processor is further configured to:
control the transceiver to receive priority information for a plurality of PSFCHs through a physical sidelink control channel (PSCCH), and
identify one or more PSFCHs among the plurality of PSFCHs based on the received priority information, and
wherein the identified one or more PSFCHs are transmitted.

13. A second user equipment (UE) in a wireless communication system, the second UE comprising:
a transceiver; and
a processor coupled to the transceiver, the processor configured to control transceiver to:
transmit sidelink control information (SCI) to a first UE, and
receive hybrid automatic repeat request (HARQ) feedback information through a physical sidelink feedback channel (PSFCH),
wherein a PSFCH resource for the HARQ feedback information corresponds to (UEindexGroup+Aspect) mod $N_{PFSCH}$,
wherein the UEindexGroup indicates zero or an identity of the first UE,
wherein the Aspect indicates a physical layer source identifier, and
wherein the $N_{PFSCH}$ indicates a number of PSFCH resources available for transmitting the HARQ feedback information.

14. The second UE of claim 13,
wherein the UEindexGroup is determined based on a HARQ feedback type, and
wherein the HARQ feedback type is identified based on the SCI.

15. The second UE of claim 13,
wherein the processor is further configured to:
in case that a transmission of a first PSFCH would overlap in time with a reception of a second PSFCH, receiving the first PSFCH or transmitting of the second PSFCH based on priority information for a plurality of PSFCHs through a physical sidelink control channel (PSCCH),
wherein the priority information is identified at the first UE.

16. The second UE of claim 13,
wherein the processor is further configured to:
control the transceiver to transmit priority information for a plurality of PSFCHs through a physical sidelink control channel (PSCCH), to the first UE, and
wherein one or more PSFCHs among the plurality of PSFCHs for are transmitted based on the transmitted priority information.

* * * * *